(12) United States Patent
Shimura

(10) Patent No.: US 11,646,761 B2
(45) Date of Patent: May 9, 2023

(54) WIRELESS DEVICE

(71) Applicant: FUJITSU LIMITED, Kawasaki (JP)

(72) Inventor: Toshihiro Shimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 17/218,223

(22) Filed: Mar. 31, 2021

(65) Prior Publication Data

US 2021/0376875 A1   Dec. 2, 2021

(30) Foreign Application Priority Data

May 27, 2020   (JP) .............................. JP2020-092672

(51) Int. Cl.
| | |
|---|---|
| *H04B 1/712* | (2011.01) |
| *H01Q 1/24* | (2006.01) |
| *H01Q 3/42* | (2006.01) |
| *H04B 1/30* | (2006.01) |

(52) U.S. Cl.
CPC ............ *H04B 1/712* (2013.01); *H01Q 1/247* (2013.01); *H01Q 3/42* (2013.01); *H04B 1/30* (2013.01); *H04B 2001/307* (2013.01)

(58) Field of Classification Search
CPC .... H04B 1/712; H04B 1/30; H04B 2001/307; H04B 1/0483; H04B 1/18; H04B 1/0458; H04B 7/0617; H04B 7/0408; H01Q 1/247; H01Q 3/42

See application file for complete search history.

(56) References Cited

U.S. PATENT DOCUMENTS

| | | | | |
|---|---|---|---|---|
| 11,469,501 | B2 * | 10/2022 | Tang | ..................... H01Q 3/38 |
| 2002/0057219 | A1 | 5/2002 | Obayashi | |
| 2012/0121043 | A1 | 5/2012 | Wambacq | |
| 2012/0280861 | A1 | 11/2012 | Kishimoto et al. | |
| 2017/0365925 | A1 * | 12/2017 | Jian | ..................... H01Q 3/38 |
| 2019/0028153 | A1 | 1/2019 | Suyama et al. | |

FOREIGN PATENT DOCUMENTS

| | | | | |
|---|---|---|---|---|
| CN | 1167299 | C | * 9/2004 | ............ H01Q 1/243 |
| CN | 101207235 | B | * 10/2011 | |
| JP | H05-191153 | A | 7/1993 | |
| JP | 2003-332953 | A | 11/2003 | |
| JP | 2014003430 | A | * 1/2014 | |
| JP | 2017152872 | A | * 8/2017 | |
| WO | 2017/135389 | A1 | 8/2017 | |

OTHER PUBLICATIONS

Extended European Search Report dated Jul. 21, 2021 for corresponding European Patent Application No. 21165411.6, 9 pages.

* cited by examiner

*Primary Examiner* — Jean B Corrielus
(74) *Attorney, Agent, or Firm* — Fujitsu Patent Center

(57) ABSTRACT

A wireless device includes a phase control circuit and an antenna element. The phase control circuit configured to control each of phases frequencies of the plurality of transmission signals according to a transmission direction of which each the plurality of transmission signals is output, up-convert each frequencies of the plurality of transmission signals of which the phase is controlled. The antenna element configured to radiate a signal obtained by combining the upconverted plurality of transmission signals.

13 Claims, 40 Drawing Sheets

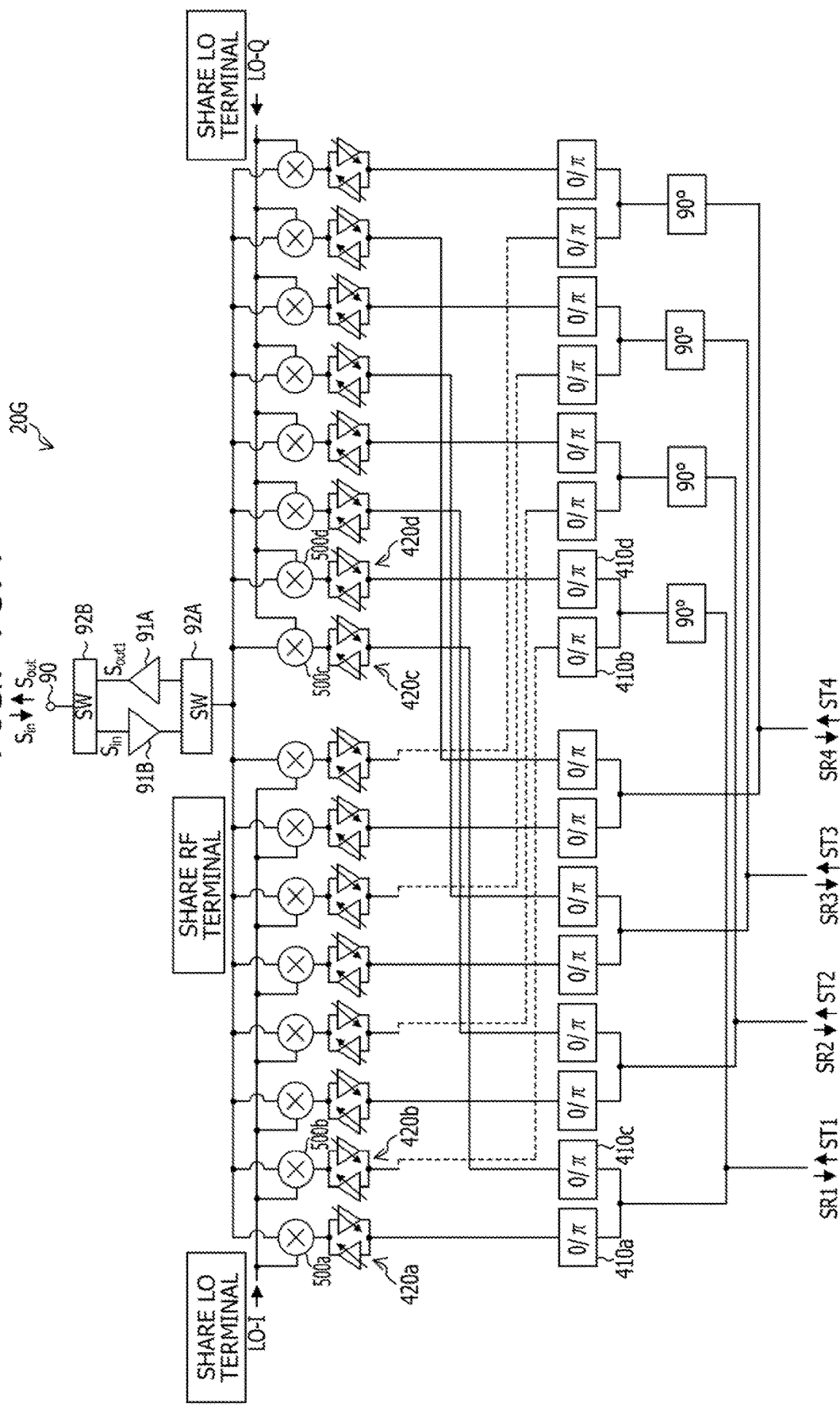

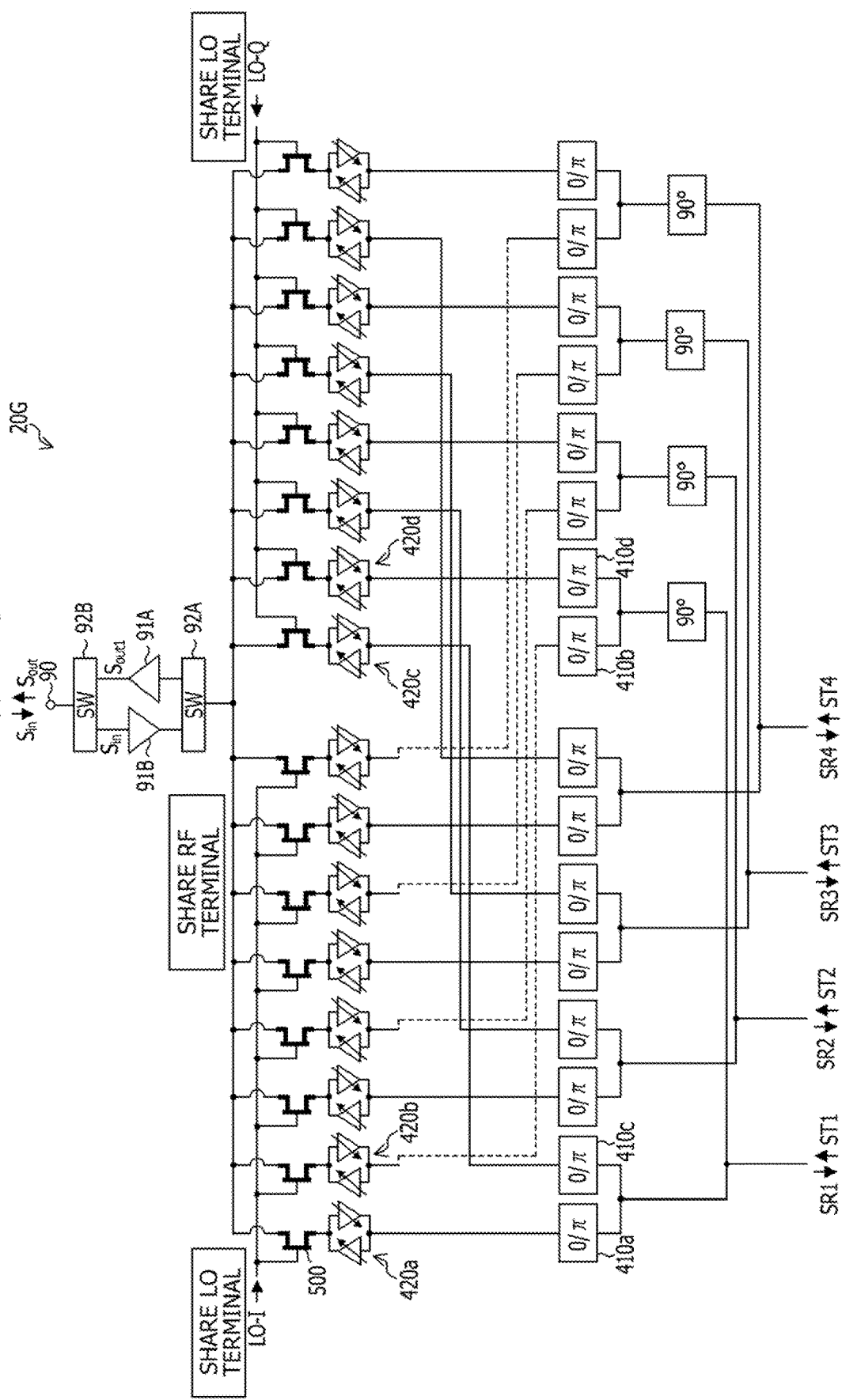

FIG. 18A

| [1] OUTPUT PHASE STATE OF RF SIGNAL (AT THE TIME OF TRANSMISSION) AND OUTPUT PHASE STATE OF IF SIGNAL (AT THE TIME OF RECEPTION) IDENTIFICATION SYMBOL | [2] IDENTIFICATION SYMBOL OF MIXER | [3] INPUT PHASE OF LO SIGNAL TO MIXER | [4] LO INVERSION RF SIDEBAND GROUPING |
|---|---|---|---|
| U1 | A | 0 | g |
| | B | 0 | g |
| | C | 180 | g |
| | D | 180 | h |
| | E | 90 | h |
| | F | 90 | h |
| | G | -90 | h |
| | H | -90 | h |
| U2 | A | 0 | g |
| | B | 0 | g |
| | C | 180 | g |
| | D | 180 | h |
| | E | 90 | h |
| | F | 90 | h |
| | G | -90 | h |
| | H | -90 | h |
| U3 | A | 0 | g |
| | B | 0 | g |
| | C | 180 | g |
| | D | 180 | h |
| | E | 90 | h |
| | F | 90 | h |
| | G | -90 | h |
| | H | -90 | h |
| U4 | A | 0 | g |
| | B | 0 | g |
| | C | 180 | g |
| | D | 180 | h |
| | E | 90 | h |
| | F | 90 | h |
| | G | -90 | h |
| | H | -90 | h |

FIG. 18B

| [5] PHASE INVERSION OF LO SIGNAL 1: NON-INVERSION -1: INVERSION | [6] INPUT PHASE OF IF SIGNAL TO MIXER (AT THE TIME OF TRANSMISSION) AND OUTPUT PHASE FROM MIXER (AT THE TIME OF RECEPTION) | [7] IF INVERSION RF SIDEBAND GROUPING | [8] PHASE INVERSION OF IF SIGNAL 1: NON-INVERSION -1: INVERSION |
|---|---|---|---|
| 1 | 0 | e | 1 |
| 1 | -90 | f | 1 |
| 1 | 0 | e | -1 |
| 1 | -90 | f | -1 |
| 1 | 0 | e | 1 |
| 1 | -90 | f | 1 |
| 1 | 0 | e | -1 |
| 1 | -90 | f | 1 |
| 1 | 0 | e | -1 |
| 1 | -90 | f | 1 |
| 1 | 0 | e | 1 |
| 1 | -90 | f | -1 |
| 1 | 0 | e | 1 |
| 1 | -90 | f | 1 |
| 1 | 0 | e | -1 |
| 1 | -90 | f | -1 |
| 1 | 0 | e | -1 |
| 1 | -90 | f | -1 |
| 1 | 0 | e | -1 |
| 1 | -90 | f | -1 |
| 1 | 0 | e | -1 |
| 1 | -90 | f | -1 |
| 1 | 0 | e | 1 |
| 1 | -90 | f | -1 |
| 1 | 0 | e | 1 |
| 1 | -90 | f | -1 |
| 1 | 0 | e | -1 |
| 1 | -90 | f | 1 |
| 1 | 0 | e | -1 |
| 1 | -90 | f | 1 |

FIG. 18C

| [9] | [10] | [11] | [12] | [13] |
|---|---|---|---|---|
| PHASE INVERSION GROUPING OF IF SIGNAL | PHASE OF UPPER SIDEBAND OF RF SIGNAL | PHASE OF LOWER SIDEBAND OF RF SIGNAL | PHASE OF RF SIGNAL AT THE TIME OF SYNTHESIS (AT THE TIME OF TRANSMISSION) OR AT THE TIME OF DISTRIBUTION (AT THE TIME OF RECEPTION) 1: IN-PHASE SYNTHESIS (DISTRIBUTION) - 1: REVERSE-PHASE SYNTHESIS (DISTRIBUTION) | PHASE OF LEAKED LO SIGNAL |
| a | 0 | 0 | 1 | 0 |
| b | -90 | 90 | 1 | 0 |
| a | 0 | 0 | 1 | 180 |
| b | -90 | 90 | 1 | 180 |
| b | 90 | 90 | -1 | -90 |
| a | 180 | 0 | -1 | -90 |
| b | 90 | 90 | -1 | 90 |
| a | 180 | 0 | -1 | 90 |
| a | 180 | 180 | 1 | 0 |
| b | -90 | 90 | 1 | 0 |
| a | 180 | 180 | 1 | 180 |
| b | -90 | 90 | 1 | 180 |
| b | 90 | 90 | -1 | -90 |
| a | 0 | 180 | -1 | -90 |
| b | 90 | 90 | -1 | 90 |
| a | 0 | 180 | -1 | 90 |
| a | 180 | 180 | 1 | 0 |
| b | 90 | -90 | 1 | 0 |
| a | 180 | 180 | 1 | 180 |
| b | 90 | -90 | 1 | 180 |
| b | 90 | 90 | 1 | 90 |
| a | 180 | 0 | 1 | 90 |
| b | 90 | 90 | 1 | -90 |
| a | 180 | 0 | 1 | -90 |
| a | 0 | 0 | 1 | 0 |
| b | 90 | 90 | 1 | 0 |
| a | 0 | -90 | 1 | 180 |
| b | 90 | 0 | 1 | 180 |
| b | 90 | -90 | 1 | 90 |
| a | 0 | 180 | 1 | 90 |
| b | 90 | 90 | 1 | -90 |
| a | 0 | 180 | 1 | -90 |

FIG. 18D

| [14] | [15] | [16] | [17] |
|---|---|---|---|
| RF SIGNAL OUTPUT PHASE (AT THE TIME OF TRANSMISSION), IF SIGNAL OUTPUT PHASE (AT THE TIME OF RECEPTION) | RF SIGNAL UPPER SIDEBAND AMPLITUDE 0: NO OUTPUT 1: OUTPUT | RF SIGNAL LOWER SIDEBAND AMPLITUDE 0: NO OUTPUT 1: OUTPUT | LO SIGNAL LEAKAGE TO RF TERMINAL 0: NO LEAKAGE 1: LEAKAGE |
| -45 | 1 | 0 | 0 |
| -135 | 1 | 0 | 0 |
| 135 | 1 | 0 | 0 |
| 45 | 1 | 0 | 0 |

FIG. 21A

| [1] OUTPUT PHASE STATE OF RF SIGNAL (AT THE TIME OF TRANSMISSION) AND OUTPUT PHASE STATE OF IF SIGNAL (AT THE TIME OF RECEPTION) IDENTIFICATION SYMBOL | [2] IDENTIFICATION SYMBOL OF MIXER | [3] INPUT PHASE OF LO SIGNAL TO MIXER | [4] LO INVERSION RF SIDEBAND GROUPING |
|---|---|---|---|
| U1 | A | 0 | g |
|  | B | 0 | g |
|  | C | 180 | g |
|  | D | 180 | h |
|  | E | 90 | h |
|  | F | 90 | h |
|  | G | -90 | h |
|  | H | -90 | h |
| U2 | A | 0 | g |
|  | B | 0 | g |
|  | C | 180 | g |
|  | D | 180 | h |
|  | E | 90 | h |
|  | F | 90 | h |
|  | G | -90 | h |
|  | H | -90 | h |
| U3 | A | 0 | g |
|  | B | 0 | g |
|  | C | 180 | g |
|  | D | 180 | h |
|  | E | 90 | h |
|  | F | 90 | h |
|  | G | -90 | h |
|  | H | -90 | h |
| U4 | A | 0 | g |
|  | B | 0 | g |
|  | C | 180 | g |
|  | D | 180 | h |
|  | E | 90 | h |
|  | F | 90 | h |
|  | G | -90 | h |
|  | H | -90 | h |

FIG. 21B

| [5] PHASE INVERSION OF LO SIGNAL 1: NON-INVERSION -1: INVERSION | [6] INPUT PHASE OF IF SIGNAL TO MIXER (AT THE TIME OF TRANSMISSION) AND OUTPUT PHASE FROM MIXER (AT THE TIME OF RECEPTION) | [7] IF INVERSION RF SIDEBAND GROUPING | [8] PHASE INVERSION OF IF SIGNAL 1: NON-INVERSION -1: INVERSION |
|---|---|---|---|
| 1 | 0 | e | 1 |
| 1 | -90 | f | 1 |
| 1 | 0 | e | 1 |
| 1 | -90 | f | 1 |
| 1 | 0 | e | 1 |
| 1 | -90 | f | 1 |
| 1 | 0 | e | 1 |
| 1 | -90 | f | 1 |
| 1 | 0 | e | -1 |
| 1 | -90 | f | 1 |
| 1 | 180 | e | -1 |
| 1 | 90 | f | 1 |
| 1 | 180 | e | 1 |
| 1 | -90 | f | -1 |
| 1 | 0 | e | 1 |
| 1 | 90 | f | -1 |
| 1 | 0 | e | -1 |
| 1 | -90 | f | -1 |
| 1 | 180 | e | -1 |
| 1 | 90 | f | -1 |
| 1 | 180 | e | -1 |
| 1 | -90 | f | -1 |
| 1 | 0 | e | -1 |
| 1 | 90 | f | -1 |
| 1 | 0 | e | 1 |
| 1 | -90 | f | -1 |
| 1 | 180 | e | 1 |
| 1 | 90 | f | 1 |
| 1 | 180 | e | -1 |
| 1 | -90 | f | 1 |
| 1 | 0 | e | -1 |
| 1 | 90 | f | 1 |

FIG. 21C

| [9] | [10] | [11] | [12] | [13] |
|---|---|---|---|---|
| PHASE INVERSION GROUPING OF IF SIGNAL | PHASE OF UPPER SIDEBAND OF RF SIGNAL | PHASE OF LOWER SIDEBAND OF RF SIGNAL | PHASE OF RF SIGNAL AT THE TIME OF SYNTHESIS (AT THE TIME OF TRANSMISSION) OR AT THE TIME OF DISTRIBUTION (AT THE TIME OF RECEPTION) 1: IN-PHASE SYNTHESIS (DISTRIBUTION) -1: REVERSE-PHASE SYNTHESIS (DISTRIBUTION) | PHASE OF LEAKED LO SIGNAL |
| a | 0 | 0 | 1 | 0 |
| b | -90 | 90 | 1 | 0 |
| a | 0 | 0 | 1 | 180 |
| b | -90 | 90 | 1 | 180 |
| b | -90 | -90 | 1 | 90 |
| a | 0 | 180 | 1 | 90 |
| b | -90 | -90 | 1 | -90 |
| a | 0 | 180 | 1 | -90 |
| a | 180 | 180 | 1 | 0 |
| b | -90 | 90 | 1 | 0 |
| a | 180 | 180 | 1 | 180 |
| b | -90 | 90 | 1 | 180 |
| b | -90 | -90 | 1 | 90 |
| a | 180 | 0 | 1 | 90 |
| b | -90 | -90 | 1 | -90 |
| a | 180 | 0 | 1 | -90 |
| a | 180 | 180 | 1 | 0 |
| b | 90 | -90 | 1 | 0 |
| a | 180 | 180 | 1 | 180 |
| b | 90 | -90 | 1 | 180 |
| b | 90 | 90 | 1 | 90 |
| a | 180 | 0 | 1 | 90 |
| b | 90 | 90 | 1 | -90 |
| a | 180 | 0 | 1 | -90 |
| a | 0 | 0 | 1 | 0 |
| b | 90 | -90 | 1 | 0 |
| a | 0 | 0 | 1 | 180 |
| b | 90 | -90 | 1 | 180 |
| b | 90 | 90 | 1 | 90 |
| a | 0 | 180 | 1 | 90 |
| b | 90 | 90 | 1 | -90 |
| a | 0 | 180 | 1 | -90 |

FIG. 21D

| [14] | [15] | [16] | [17] |
|---|---|---|---|
| RF SIGNAL OUTPUT PHASE (AT THE TIME OF TRANSMISSION), IF SIGNAL OUTPUT PHASE (AT THE TIME OF RECEPTION) | RF SIGNAL UPPER SIDEBAND AMPLITUDE 0: NO OUTPUT 1: OUTPUT | RF SIGNAL LOWER SIDEBAND AMPLITUDE 0: NO OUTPUT 1: OUTPUT | LO SIGNAL LEAKAGE TO RF TERMINAL 0: NO LEAKAGE 1: LEAKAGE |
| -45 | 1 | 0 | 0 |
| -135 | 1 | 0 | 0 |
| 135 | 1 | 0 | 0 |
| 45 | 1 | 0 | 0 |

FIG. 24A

| [1] OUTPUT PHASE STATE OF RF SIGNAL (AT THE TIME OF TRANSMISSION) AND OUTPUT PHASE STATE OF IF SIGNAL (AT THE TIME OF RECEPTION) IDENTIFICATION SYMBOL | [2] IDENTIFICATION SYMBOL OF MIXER | [3] INPUT PHASE OF LO SIGNAL TO MIXER | [4] LO INVERSION RF SIDEBAND GROUPING |
|---|---|---|---|
| U1 | A | 0 | g |
| | B | 0 | g |
| | C | 0 | g |
| | D | 0 | g |
| | E | 180 | g |
| | F | 180 | g |
| | G | 180 | g |
| | H | 180 | g |
| | I | 90 | h |
| | J | 90 | h |
| | K | 90 | h |
| | L | 90 | h |
| | M | -90 | h |
| | N | -90 | h |
| | O | -90 | h |
| | P | -90 | h |
| U2 | A | 0 | g |
| | B | 0 | g |
| | C | 0 | g |
| | D | 0 | g |
| | E | 180 | g |
| | F | 180 | g |
| | G | 180 | g |
| | H | 180 | g |
| | I | 90 | h |
| | J | 90 | h |
| | K | 90 | h |
| | L | 90 | h |
| | M | 270 | h |
| | N | 270 | h |
| | O | 270 | h |
| | P | 270 | h |

FIG. 24B

| [1] OUTPUT PHASE STATE OF RF SIGNAL (AT THE TIME OF TRANSMISSION) AND OUTPUT PHASE STATE OF IF SIGNAL (AT THE TIME OF RECEPTION) IDENTIFICATION SYMBOL | [2] IDENTIFICATION SYMBOL OF MIXER | [3] INPUT PHASE OF LO SIGNAL TO MIXER | [4] LO INVERSION RF SIDEBAND GROUPING |
|---|---|---|---|
| U3 | A | 0 | g |
| | B | 0 | g |
| | C | 0 | g |
| | D | 0 | g |
| | E | 180 | g |
| | F | 180 | g |
| | G | 180 | g |
| | H | 180 | g |
| | I | 90 | h |
| | J | 90 | h |
| | K | 90 | h |
| | L | 90 | h |
| | M | 270 | h |
| | N | 270 | h |
| | O | 270 | h |
| | P | 270 | h |
| U4 | A | 0 | g |
| | B | 0 | g |
| | C | 0 | g |
| | D | 0 | g |
| | E | 180 | g |
| | F | 180 | g |
| | G | 180 | g |
| | H | 180 | g |
| | I | 90 | h |
| | J | 90 | h |
| | K | 90 | h |
| | L | 90 | h |
| | M | 270 | h |
| | N | 270 | h |
| | O | 270 | h |
| | P | 270 | h |

FIG. 24C

| [5] PHASE INVERSION OF LO SIGNAL 1: NON-REVERSAL -1:INVERSION | [6] INPUT PHASE FOR MIXER OF IF SIGNAL (TRANSMISSION) OUTPUT PHASE FOR MIXER (RECEPTION) | [7] IF INVER SIDE BAND GROUPING | [8] PHASE INVERSION OF IF SIGNAL 1: NON-REVERSAL -1:INVERSION |
|---|---|---|---|
| 1 | 0 | e | 1 |
| 1 | 180 | e | 1 |
| 1 | 90 | e | 1 |
| 1 | -90 | e | 1 |
| 1 | 0 | e | 1 |
| 1 | 180 | e | 1 |
| 1 | 90 | e | 1 |
| 1 | -90 | e | 1 |
| 1 | 0 | f | 1 |
| 1 | 180 | f | 1 |
| 1 | 90 | f | 1 |
| 1 | -90 | f | 1 |
| 1 | 0 | f | 1 |
| 1 | 180 | f | 1 |
| 1 | 90 | f | 1 |
| 1 | -90 | f | 1 |
| 1 | 0 | e | -1 |
| 1 | 180 | e | -1 |
| 1 | 90 | e | 1 |
| 1 | 270 | e | 1 |
| 1 | 0 | e | -1 |
| 1 | 180 | e | -1 |
| 1 | 90 | e | 1 |
| 1 | 270 | e | 1 |
| 1 | 0 | f | 1 |
| 1 | 180 | f | 1 |
| 1 | 90 | f | -1 |
| 1 | 270 | f | -1 |
| 1 | 0 | f | 1 |
| 1 | 180 | f | 1 |
| 1 | 90 | f | -1 |
| 1 | 270 | f | 1 |

FIG. 24D

| [5] | [6] | [7] | [8] |
|---|---|---|---|
| PHASE INVERSION OF LO SIGNAL 1: NON-REVERSAL -1:INVERSION | INPUT PHASE FOR MIXER OF IF SIGNAL (TRANSMISSION) OUTPUT PHASE FOR MIXER (RECEPTION) | IF INVER SIDE BAND GROUPING | PHASE INVERSION OF IF SIGNAL 1: NON-REVERSAL -1:INVERSION |
| 1 | 0 | e | -1 |
| 1 | 180 | e | -1 |
| 1 | 90 | e | -1 |
| 1 | 270 | e | -1 |
| 1 | 0 | e | -1 |
| 1 | 180 | e | -1 |
| 1 | 90 | e | -1 |
| 1 | 270 | e | -1 |
| 1 | 0 | f | -1 |
| 1 | 180 | f | -1 |
| 1 | 90 | f | -1 |
| 1 | 270 | f | -1 |
| 1 | 0 | f | -1 |
| 1 | 180 | f | -1 |
| 1 | 90 | f | -1 |
| 1 | 270 | f | -1 |
| 1 | 0 | e | -1 |
| 1 | 180 | e | -1 |
| 1 | 90 | e | -1 |
| 1 | 270 | e | -1 |
| 1 | 0 | e | -1 |
| 1 | 180 | e | -1 |
| 1 | 90 | e | -1 |
| 1 | 270 | e | -1 |
| 1 | 0 | f | -1 |
| 1 | 180 | f | -1 |
| 1 | 90 | f | -1 |
| 1 | 270 | f | -1 |
| 1 | 0 | f | -1 |
| 1 | 180 | f | -1 |
| 1 | 90 | f | -1 |
| 1 | 270 | f | -1 |

FIG. 24E

| [9] | [10] | [11] | [12] | [13] |
|---|---|---|---|---|
| PHASE INVERSION GROUPING OF IF SIGNAL | PHASE OF UPPER SIDEBAND OF RF SIGNAL | PHASE OF LOWER SIDEBAND OF RF SIGNAL | PHASE OF RF SIGNAL AT THE TIME OF SYNTHESIS (AT THE TIME OF TRANSMISSION) OR AT THE TIME OF DISTRIBUTION (AT THE TIME OF RECEPTION) 1: IN-PHASE SYNTHESIS (DISTRIBUTION) -1: REVERSE-PHASE SYNTHESIS (DISTRIBUTION) | PHASE OF LEAKED LO SIGNAL |
| a | 0 | 0 | 1 | 0 |
| a | 180 | 180 | -1 | 180 |
| b | 90 | 90 | 1 | 0 |
| b | -90 | -90 | -1 | 180 |
| a | 180 | 180 | -1 | 0 |
| a | 0 | 0 | 1 | 180 |
| b | -90 | -90 | -1 | 0 |
| b | 90 | 90 | 1 | 180 |
| b | 90 | 90 | 1 | 90 |
| b | -90 | -90 | -1 | -90 |
| a | 180 | 0 | -1 | -90 |
| a | 0 | 180 | 1 | 90 |
| b | -90 | -90 | -1 | 90 |
| b | 90 | 90 | 1 | -90 |
| a | 0 | 180 | 1 | -90 |
| a | 180 | 0 | -1 | 90 |
| a | 180 | 180 | 1 | 0 |
| a | 0 | 0 | -1 | 180 |
| b | 90 | -90 | 1 | 0 |
| b | -90 | 90 | -1 | 180 |
| a | 0 | 0 | -1 | 0 |
| a | 180 | 180 | 1 | 180 |
| b | -90 | 90 | -1 | 0 |
| b | 90 | -90 | 1 | 180 |
| b | 90 | 90 | 1 | 90 |
| b | 90 | -90 | -1 | -90 |
| a | 0 | 180 | -1 | -90 |
| a | 180 | 0 | 1 | 90 |
| b | -90 | -90 | -1 | 90 |
| b | 90 | 90 | 1 | -90 |
| a | 180 | 0 | 1 | -90 |
| a | 0 | 180 | -1 | 90 |

FIG. 24F

| [9] | [10] | [11] | [12] | [13] |
|---|---|---|---|---|
| PHASE INVERSION GROUPING OF IF SIGNAL | PHASE OF UPPER SIDEBAND OF RF SIGNAL | PHASE OF LOWER SIDEBAND OF RF SIGNAL | PHASE OF RF SIGNAL AT THE TIME OF SYNTHESIS (AT THE TIME OF TRANSMISSION) OR AT THE TIME OF DISTRIBUTION (AT THE TIME OF RECEPTION) 1: IN-PHASE SYNTHESIS (DISTRIBUTION) -1: REVERSE-PHASE SYNTHESIS (DISTRIBUTION) | PHASE OF LEAKED LO SIGNAL |
| a | 180 | 180 | 1 | 0 |
| a | 0 | 0 | -1 | 180 |
| b | -90 | 90 | 1 | 0 |
| b | 90 | -90 | -1 | 180 |
| a | 0 | 0 | -1 | 0 |
| a | 180 | 180 | 1 | 180 |
| b | 90 | -90 | -1 | 0 |
| b | -90 | 90 | 1 | 180 |
| b | -90 | -90 | 1 | 90 |
| b | 90 | 90 | -1 | -90 |
| a | 0 | 180 | -1 | -90 |
| a | 180 | 0 | 1 | 90 |
| b | 90 | 90 | -1 | 90 |
| b | -90 | -90 | 1 | -90 |
| a | 180 | 0 | 1 | -90 |
| a | 0 | 180 | -1 | 90 |
| a | 0 | 0 | 1 | 0 |
| a | 180 | 180 | -1 | 180 |
| b | -90 | 90 | 1 | 0 |
| b | 90 | -90 | -1 | 180 |
| a | 180 | 180 | -1 | 0 |
| a | 0 | 0 | 1 | 180 |
| b | 90 | -90 | -1 | 0 |
| b | -90 | 90 | 1 | 180 |
| b | -90 | -90 | 1 | 90 |
| b | 90 | 90 | -1 | -90 |
| a | 180 | 0 | -1 | -90 |
| a | 0 | 180 | 1 | 90 |
| b | 90 | 90 | -1 | 90 |
| b | -90 | -90 | 1 | -90 |
| a | 0 | 180 | 1 | -90 |
| a | 180 | 0 | -1 | 90 |

FIG. 24G

| [14] RF SIGNAL OUTPUT PHASE (AT THE TIME OF TRANSMISSION), IF SIGNAL OUTPUT PHASE (AT THE TIME OF RECEPTION) | [15] RF SIGNAL UPPER SIDEBAND AMPLITUDE 0: NO OUTPUT 1: OUTPUT | [16] RF SIGNAL LOWER SIDEBAND AMPLITUDE 0: NO OUTPUT 1: OUTPUT | [17] LO SIGNAL LEAKAGE TO RF TERMINAL 0: NO LEAKAGE 1: LEAKAGE |
|---|---|---|---|
| -45 | 1 | 0 | 0 |
| 135 | 1 | 0 | 0 |
| -135 | 1 | 0 | 0 |
| -45 | 0 | 0 | 0 |

WIRELESS DEVICE

CROSS-REFERENCE TO RELATED APPLICATION

This application is based upon and claims the benefit of priority of the prior Japanese Patent Application No. 2020-92672, filed on May 27, 2020, the entire contents of which are incorporated herein by reference.

FIELD

The disclosed technique discussed herein is related to a wireless device.

BACKGROUND

In recent years, regarding a wireless device using a high frequency band (for example, microwave band and millimeter-wave band), as one of techniques for multiplexing signals to be transmitted/received or enhancing accuracy of sensing (radar), beamforming is put into practical use. As the technique related to the wireless device to which beamforming is applied, the following technique has been known.

For example, a wireless device has been known that includes a first antenna element group, a full digital array that does not include an analog variable phase shifter, a second antenna element group including a plurality of antenna elements, and a hybrid beamformer that includes an analog variable phase shifter.

Furthermore, a wireless relay device has been known that includes a reception antenna, a transmission array antenna including a plurality of antenna elements, a Low Noise Amplifier (LNA), a noise removal Band pass filter (BPF), a mixer, a local oscillator, a narrow band BPF, an amplifier, a controller, an RF phase shifter, an image removal BPF, and a Power Amplifier (PA).

Furthermore, an image rejection mixer has been known that includes a distributor that divides an RF signal into two in the same phase, a distributor that divides a local signal into two with a phase difference of 90 degrees, and a first and a second mixers that mix distributed outputs of the respective distributors. This image rejection mixer includes two pairs of resistor and capacitance circuits connected to the outputs of the first and the second mixers in series, a load resistor connected to each of a connection point of a resistor and a connection point of a capacitance, and an IF output terminal that reduces image signals on one side of the load resistor.

International Publication Pamphlet No. WO 2017/135389, Japanese Laid-open Patent Publication No. 2003-332953, and Japanese Laid-open Patent Publication No. 5-191153 are disclosed as related art.

SUMMARY

According to an aspect of the embodiments, a wireless device includes: a plurality of antenna elements configured to form a plurality of transmission beams, each of the plurality of transmission beams being configured to transmit a corresponding transmission signal among a plurality of transmission signals; and a plurality of phase controller, each of the plurality of phase controller being couple to a corresponding antenna element among the plurality of antenna elements, each of the plurality of phase controller including: a plurality of phase control circuits corresponding to the plurality of transmission beams and configured to receive an input of the plurality of transmission signals to be transmitted from the corresponding antenna element, each of the plurality of phase control circuits being a circuit allocated to among the plurality of transmission beams a corresponding transmission beam to be used to transmit a corresponding transmission signal among the plurality of transmission signals, each of the plurality of phase control circuits being configured to output a phase controlled transmission signal by controlling, based on a transmission direction of the corresponding transmission beam, a phase of the corresponding transmission signal, and a plurality of mixers, each of the plurality of mixers being allocated to a corresponding phase control circuit among the plurality of phase control circuits, each of the plurality of mixers being configured to output an up-converted signal by up-converting, in response to inputting of the phase controlled transmission signal from the corresponding phase control circuit, a frequency of the phase controlled transmission signal, the up-converted signals output from the plurality of mixers are merged and radiated from the corresponding antenna element.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15A is a diagram illustrating an example of a configuration of a phase control circuit according to an eighth embodiment of the disclosed technique;

FIG. 15B is a diagram illustrating an example of the configuration of the phase control circuit according to the eighth embodiment of the disclosed technique;

FIG. 18A is a table illustrating an example of an operation of the phase control circuit according to the ninth embodiment of the disclosed technique;

FIG. 18B is a table illustrating an example of an operation of the phase control circuit according to the ninth embodiment of the disclosed technique;

FIG. 18C is a table illustrating an example of an operation of the phase control circuit according to the ninth embodiment of the disclosed technique;

FIG. 18D is a table illustrating an example of an operation of the phase control circuit according to the ninth embodiment of the disclosed technique;

FIG. 21A is a table illustrating an example of an operation of the phase control circuit according to the tenth embodiment of the disclosed technique;

FIG. 21B is a table illustrating an example of an operation of the phase control circuit according to the tenth embodiment of the disclosed technique;

FIG. 21C is a table illustrating an example of an operation of the phase control circuit according to the tenth embodiment of the disclosed technique;

FIG. 21D is a table illustrating an example of an operation of the phase control circuit according to the tenth embodiment of the disclosed technique;

FIG. 24A is a table illustrating an example of an operation of the phase control circuit according to the eleventh embodiment of the disclosed technique;

FIG. 24B is a table illustrating an example of an operation of the phase control circuit according to the eleventh embodiment of the disclosed technique;

FIG. 24C is a table illustrating an example of an operation of the phase control circuit according to the eleventh embodiment of the disclosed technique;

FIG. 24D is a table illustrating an example of an operation of the phase control circuit according to the eleventh embodiment of the disclosed technique;

FIG. 24E is a table illustrating an example of an operation of the phase control circuit according to the eleventh embodiment of the disclosed technique;

FIG. 24F is a table illustrating an example of an operation of the phase control circuit according to the eleventh embodiment of the disclosed technique;

FIG. 24G is a table illustrating an example of an operation of the phase control circuit according to the eleventh embodiment of the disclosed technique.

DESCRIPTION OF EMBODIMENTS

A wireless device that performs beamforming forms a beam for each terminal using a plurality of antenna elements. Beamforming is realized by controlling at least one of a phase and an amplitude of a signal transmitted or received via each antenna element according to a position of the terminal so as to control a direction and a shape of a transmission beam or a reception beam.

Furthermore, a wireless device has been developed that superimposes a plurality of different signals and to which beam multiplexing for forming beams in different directions is applied. As one of methods for realizing beam multiplexing, full-digital system beamforming has been proposed.

In the full-digital system beamforming, at least one of the phase or the amplitude of the signal transmitted or received via each antenna element is controlled by digital processing. Therefore, the wireless device that performs full-digital beamforming includes a digital/analog converter (DAC) on each antenna element in order to form the transmission beams. In other words, for example, the wireless device that performs the full-digital system beamforming includes the DACs as many as the antenna elements. Furthermore, the wireless device that performs the full-digital system beamforming includes analog/digital converters (ADCs) as many as the antenna elements in order to form the reception beams. Here, power consumption of the DAC and the ADC depends on a rate of a data signal. Therefore, in a case where the wireless device that performs the full-digital system beamforming is applied to, for example, a broadband communication system that uses a millimeter-wave band or the like, the rate of the data signal increases, and the power consumption increases.

Figure 1:
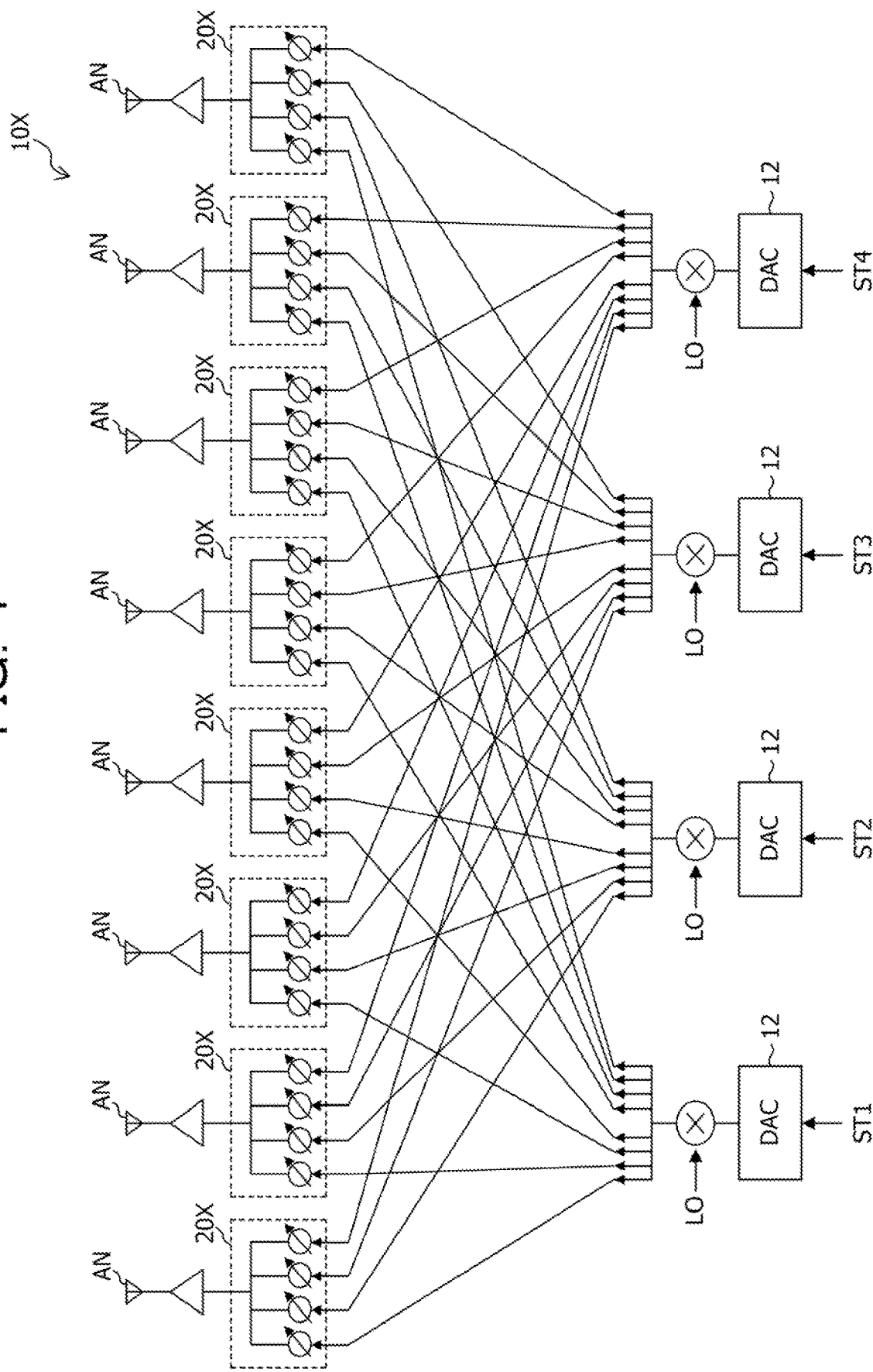
FIG. 1 is a diagram illustrating an example of a configuration of a wireless device according to a first reference example.

As another system for realizing beamforming, an analog full connection system has been proposed. FIG. 1 is a diagram illustrating an example of a configuration of a wireless device (first reference example) that performs analog full connection system beamforming.

A wireless device 10X illustrated in FIG. 1 includes four DACs 12 to house four terminals (not illustrated). Each DAC 12 converts a transmission signal to be transmitted to the terminal into an analog signal. However, it is preferable that the wireless device 10X include the larger number of antenna elements than the number of terminals (in other words, for example, the number of transmission signals). In the example illustrated in FIG. 1, the wireless device 10X includes eight antenna elements AN. In this case, transmission signals ST1 to ST4 in a baseband region or an intermediate frequency band to be transmitted to the respective terminals are distributed to the eight phase control circuits 20X provided in correspondence with the respective antenna elements AN after being up-converted to a Radio Frequency (RF) band using a local signal LO. Each of the phase control circuits 20X control phases of the transmission signals ST1 to ST4. Then, an output signal of the phase control circuit 20X is output via the corresponding antenna element AN, respectively. Each of the phase control circuits 20X controls each of the phases of the transmission signals ST1 to ST4 according to the position of the terminal so as to form a beam corresponding to each terminal.

According to the analog full connection system, it is sufficient that the DACs 12 as many as the terminals (the number of signals) be included. Therefore, the number of DACs can be reduced in comparison with that in the full digital system, and this can reduce the power consumption. However, according to the analog full connection system, a large number of signal lines intersect with each other between the plurality of DACs 12 and the plurality of phase control circuits 20X. In the example illustrated in FIG. 1, 32 signal lines are provided between the four DACs 12 and the eight phase control circuits 20X, and signals in the RF band having a relatively high frequency are transmitted through these signal lines. Therefore, a loss of the signals is large, and it is difficult to practically use this wireless device.

In order to solve the above problems, for example, it is considered to add a loss compensation circuit. However, in a case where miniaturization of the wireless device is requested, it is not preferable to add the loss compensation circuit because a circuit size (occupied area of circuit) increases. Furthermore, there is a possibility that the power consumption is increased by adding the loss compensation circuit.

An object of one aspect of the disclosed technique is to reduce a loss of signals while suppressing an increase in a circuit size (occupied area of circuit) in a wireless device that performs beamforming.

An example of an embodiment of the disclosure will be described below with reference to the drawings. Note that, in each drawing, the same or equivalent components and portions are denoted with the same reference numerals, and redundant explanation will be omitted.

First Embodiment

Figure 2:
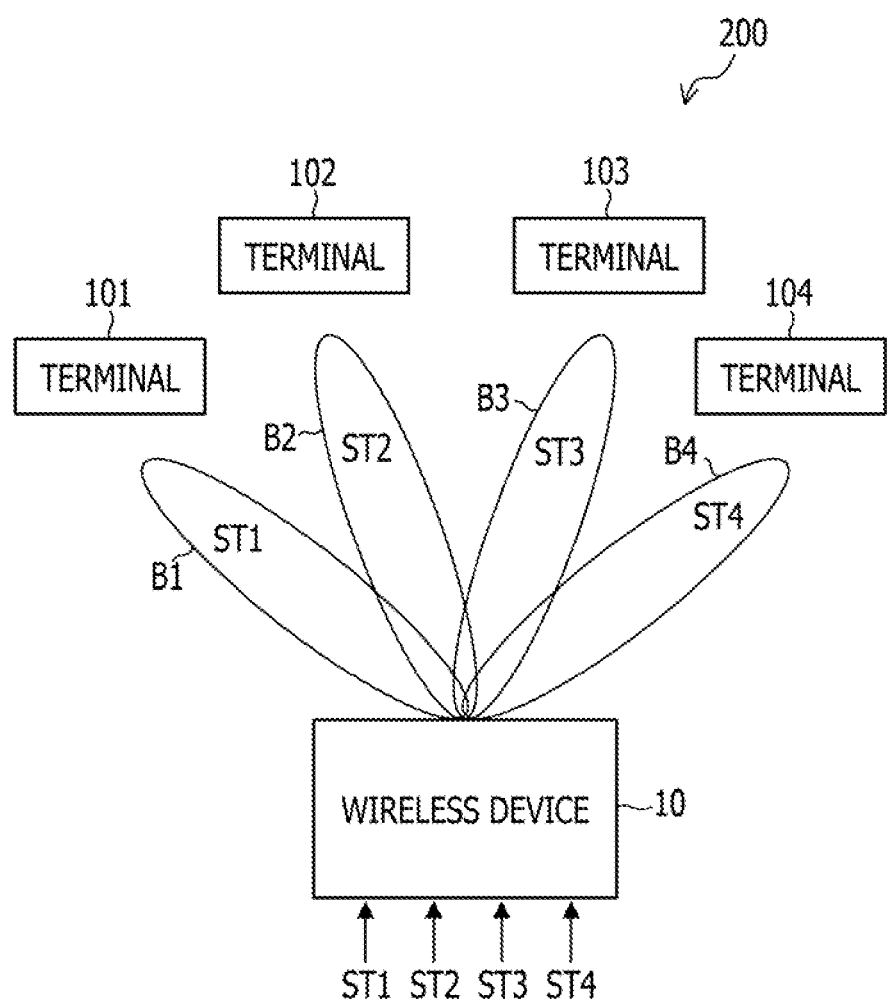
FIG. 2 is a diagram illustrating an example of a configuration of a wireless system according to an embodiment of the disclosed technique.

FIG. 2 is a diagram illustrating an example of a configuration of a wireless system 200 according to an embodiment of the disclosed technique. The wireless system 200 includes a wireless device 10 and a plurality of terminals 101, 102, 103, and 104. The wireless device 10 is not particularly limited. However, for example, the wireless device 10 is mounted on a base station of a wireless system. In this case, the terminals 101 to 104 are user terminals such as smartphones. Note that, in the present embodiment, the number of terminals contained in the wireless system 200 is four. However, the number of terminals contained in the wireless system 200 can be appropriately increased or decreased. The wireless device 10 can form a transmission beam for transmitting signals to the terminals 101 to 104 and a reception beam for receiving signals from the terminals 101 to 104. In other words, for example, the wireless device 10 has a function for forming the transmission beam to transmit the signals and a function for forming the reception beam to receive the signals. In the following, the signal transmission function will be mainly described.

Transmission signals ST1 to ST4 to be transmitted to the terminals 101 to 104, respectively are given to the wireless device 10. The wireless device 10 forms transmission beams B1 to B4 used to transmit the transmission signals ST1 to ST4 to the terminals 101 to 104, respectively. The transmission beam B1 is formed to transmit the transmission signal ST1 from the wireless device 10 to the terminal 101. Therefore, the transmission beam B1 is formed in a direction from the wireless device 10 toward the terminal 101. Similarly, the transmission beams B2 to B4 are formed to transmit the transmission signals ST2 to ST4 from the wireless device 10 to the terminals 102 to 104, respectively. In this way, the wireless device 10 can simultaneously form the plural transmission beams B1 to B4 corresponding to the terminals 101 to 104. The wireless device 10 individually controls radiation directions and shapes of the transmission beams B1 to B4 according to positions of the terminals 101 to 104. In other words, for example, the wireless device 10 realizes beam multiplexing.

Figure 3:
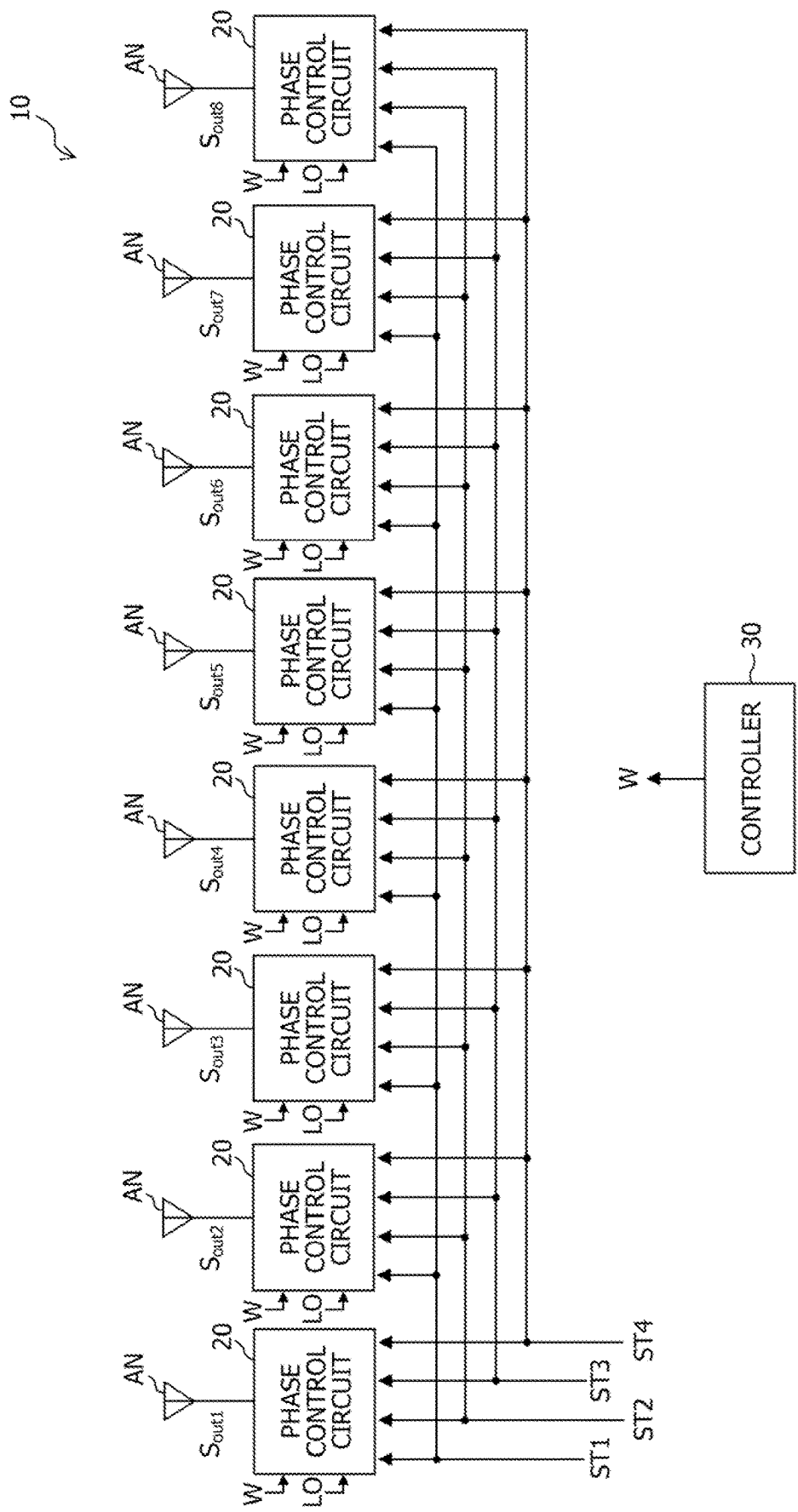
FIG. 3 is a diagram illustrating an example of a configuration of a wireless device according to the embodiment of the disclosed technique.

FIG. 3 is a diagram illustrating an example of a configuration of the wireless device 10 according to the embodiment of the disclosed technique. The wireless device 10 includes a plurality of phase control circuits 20, a plurality of antenna elements AN, and a controller 30. Note that, in FIG. 3, a reception circuit that forms reception beams is not illustrated. It is preferable that the number of antenna elements AN included in the wireless device 10 be larger than the number of terminals contained in the wireless system 200. In the present embodiment, the four terminals 101 to 104 are contained in the wireless system 200, and the eight antenna elements AN are included in the wireless device 10. The antenna elements AN are arranged in an array. In other words, for example, the wireless device 10 includes an array antenna system. The plurality of antenna elements AN may be aligned in line or may be arranged in a matrix so as to form rows and columns. Furthermore, the antenna elements AN may be three-dimensionally arranged.

The phase control circuit 20 is provided in correspondence with each of the plurality of antenna elements AN. In other words, for example, the number of phase control circuits 20 included in the wireless device 10 is the same as the number of antenna elements AN and is eight in the present embodiment. The transmission signals ST1 to ST4 are analog signals in a baseband region or an intermediate frequency band. Frequencies of the transmission signals ST1 to ST4 are not particularly limited. However, the frequencies of the transmission signals ST1 to ST4 are, for example, about 3 GHz. Note that, in a case where a transmission signal given to the wireless device 10 is a digital signal, the wireless device 10 includes a digital/analog converter that converts the digital signal into an analog signal. The transmission signals ST1 to ST4 converted into an analog format by the digital/analog converter are distributed to each of the eight phase control circuits 20. Each phase control circuit 20 controls phases of the transmission signals ST1 to ST4 using a weight W supplied from the controller 30 so as to form the transmission beams B1 to B4 used to transmit the transmission signals ST1 to ST4 to the terminals 101 to 104. In other words, for example, the wireless device 10 performs analog full connection system beamforming for distributing the transmission signals ST1 to ST4 to be transmitted to the terminals 101 to 104 to all the phase control circuits 20 included in the wireless device 10 and forming the transmission beams B1 to B4.

The controller 30 generates the weight W to control the phase by each of the phase control circuits 20 based on the positions of the terminals 101 to 104. Each of the phase control circuits 20 performs phase control, indicated by the following formula (1) using the weight W generated by the controller 30, on the transmission signals ST1 to ST4 so as to output signals $S_{out1}$ to $S_{out8}$.

[Formula 1]

$$\begin{pmatrix} W_{1,1} & \cdots & W_{1,4} \\ \vdots & \ddots & \vdots \\ W_{8,1} & \cdots & W_{8,4} \end{pmatrix} \begin{pmatrix} ST1 \\ ST2 \\ ST3 \\ ST4 \end{pmatrix} = \begin{pmatrix} S_{out1} \\ \vdots \\ S_{out8} \end{pmatrix} \quad (1)$$

For example, the output signal $S_{out1}$ output from one of the eight phase control circuits 20 is expressed by the following formula (2).

[Formula 2]

$$S_{out1} = W_{1,1} \cdot ST1 + W_{1,2} \cdot ST2 + W_{1,3} \cdot ST3 + W_{1,4} \cdot ST4 \quad (2)$$

The controller 30 generates weights $W_{1,1}$, $W_{2,1}$, $W_{3,1}$, $W_{4,1}$, $W_{5,1}$, $W_{6,1}$, $W_{7,1}$, and $W_{8,1}$ on the basis of the position of the terminal 101. Furthermore, the controller 30 generates weights $W_{1,2}$, $W_{2,2}$, $W_{3,2}$, $W_{4,2}$, $W_{5,2}$, $W_{6,2}$, $W_{7,2}$, and $W_{8,2}$ based on the position of the terminal 102. Furthermore, the controller 30 generates weights $W_{1,3}$, $W_{2,3}$, $W_{3,3}$, $W_{4,3}$, $W_{5,3}$, $W_{6,3}$, $W_{7,3}$, and $W_{8,3}$ based on the position of the terminal 103. Furthermore, the controller 30 generates weights $W_{1,4}$, $W_{2,4}$, $W_{3,4}$, $W_{4,4}$, $W_{5,4}$, $W_{6,4}$, $W_{7,4}$, and $W_{8,4}$ based on the position of the terminal 104. The weight W is updated according to a change in the positions of the terminals 101 to 104, a change in communication environment between the wireless device 10 and the terminals 101 to 104, or the like.

Each of the respective phase control circuits 20 up-convert the transmission signals ST1 to ST4 in the baseband region or the intermediate frequency band to an RF band (or millimeter waveband) using a local signal LO and output the up-converted signals as the output signals $S_{out1}$ to $S_{out8}$. The output signals $S_{out1}$ to $S_{out8}$ are radiated from the antenna elements AN to which correspond, respectively. By radiating the output signals $S_{out1}$ to $S_{out8}$, of which the phases have been controlled, from the eight antenna elements AN, respectively, the transmission beams B1 to B4 toward the terminals 101 to 104, respectively are formed. In other words, the wireless device 10 configures the array antenna system to form the transmission beams B1 to B4.

Figure 4:
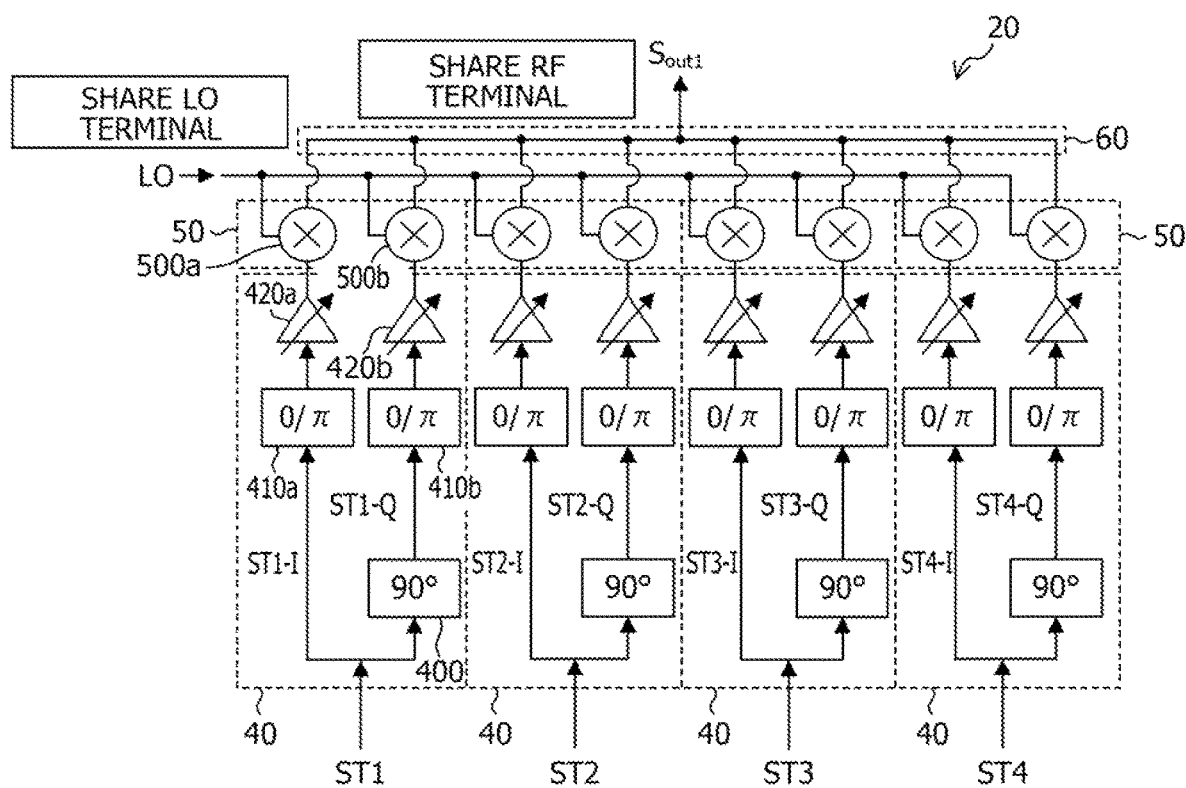
FIG. 4 is a diagram illustrating an example of a configuration of a phase control circuit according to the embodiment of the disclosed technique.

FIG. 4 is a diagram illustrating an example of a configuration of the phase control circuit 20. The configurations of the plurality of phase control circuits 20 are the same. Note that, in FIG. 4, the phase control circuit 20 that outputs the output signal $S_{out1}$ among from the eight phase control circuits 20 is illustrated. The phase control circuit 20 includes a plurality of phase control units 40, a plurality of mixer units 50, and a combining unit 60. The plurality of phase control units 40 and the plurality of mixer units 50 are provided in correspondence with the transmission signals ST1 to ST4 to be transmitted to the terminals 101 to 104, respectively.

In the phase control unit 40, for example, each passive circuit portion is configured to include at least one of a lumped parameter circuit and a circuit similar to the lumped parameter circuit such as a spiral inductor or a meander inductor, and the phase control unit 40 controls the phase of the transmission signal according to a transmission direction of the transmission signal (radiation direction of corresponding transmission beam) based on the weight W supplied from the controller 30. Each phase control unit 40 includes a phase rotation unit 400, a first phase switching unit 410*a*, a second phase switching unit 410*b*, a first variable amplifier 420*a*, and a second variable amplifier 420*b*. In each phase control unit 40, a corresponding transmission signal is branched into two. One of the divided signals is supplied to the first phase switching unit 410*a*, and the other is supplied to the phase rotation unit 400.

The transmission signal of the transmission signals ST1 to ST4 is supplied to the first phase switching unit 410*a* without rotating its phase. In other words, for example, an in-phase signal ST1-I having the same phase as the transmission signal ST1 is supplied to the first phase switching unit 410*a* corresponding to the transmission signal ST1. Similarly, in-phase signals ST2-I to ST4-I are supplied to the first phase switching units 410*a* corresponding to the transmission signals ST2 to ST4, respectively. The first phase switching unit 410*a* selectively switches a phase rotation amount of the in-phase signal according to the transmission direction of the transmission signal. The first phase switching unit 410*a* rotates the phase of the corresponding in-phase signal by the selected rotation amount. For example, the first phase switching unit 410*a* corresponding to the transmission signal ST1 selectively switches the phase rotation amount of the in-phase signal ST1-I according to the transmission direction of the transmission signal ST1 (radiation direction of transmission beam B1) and rotates the phase of the in-phase signal ST1-I. Similarly, the first phase switching units 410*a* corresponding to the transmission signals ST2 to ST4 selectively switch the phase rotation amounts of the in-phase signals ST2-I to ST4-I according to the transmission directions of the transmission signals ST2 to ST4 (radiation directions of transmission beams B2 to B4) and rotate the phases of the in-phase signals ST2-I to ST4-I.

The phase rotation unit 400 rotates the phase of the transmission signal among form the transmission signals ST1 to ST4 by 90°. In the following, a transmission signal of which the phase is rotated by 90° by the phase rotation unit 400 is referred to as a quadrature signal. In other words, for example, the phase rotation unit 400 corresponding to the transmission signal ST1 outputs a quadrature signal ST1-Q. Similarly, the phase rotation units 400 corresponding to the transmission signals ST2 to ST4 output quadrature signals ST2-Q to ST4-Q, respectively. The quadrature signals ST1-Q to ST4-Q are supplied to the second phase switching units 410*b*.

The second phase switching unit 410*b* selectively switches a phase rotation amount of the quadrature signal according to the transmission direction of the transmission signal. The second phase switching unit 410*b* rotates a phase of the quadrature signal by the selected rotation amount. For example, the second phase switching unit 410*b* corresponding to the transmission signal ST1 selectively switches a phase rotation amount of the quadrature signal ST1-Q according to the transmission direction of the transmission signal ST1 (radiation direction of transmission beam B1) and rotates a phase of the quadrature signal ST1-Q. Similarly, the second phase switching units 410*b* corresponding to the transmission signals ST2 to ST4 each selectively switch phase rotation amounts of the quadrature signals ST2-Q to ST4-Q according to the transmission directions of the transmission signals ST2 to ST4 (radiation directions of transmission beams B2 to B4) and rotate phases of the quadrature signals ST2-Q to ST4-Q. The phase rotation amounts of the first phase switching unit 410*a* and the second phase switching unit 410b are set to either one of 0° or 180° based on the weight W supplied from the controller 30.

The first variable amplifier 420a changes an amplitude of the output signal of the first phase switching unit 410a according to the transmission direction of the transmission signal. For example, the first variable amplifier 420a corresponding to the transmission signal ST1 changes an amplitude of a signal obtained by rotating the phase of the in-phase signal ST1-I by 0° or 180° according to the transmission direction of the transmission signal ST1. Similarly, the first variable amplifiers 420a corresponding to the transmission signals ST2 to ST4 each change amplitudes of signals obtained by rotating the phases of the in-phase signals ST2-I to ST4-I by 0° or 180° according to the transmission directions of the transmission signals ST2 to ST4.

The second variable amplifier 420b changes an amplitude of the output signal of the second phase switching unit 410b according to the transmission direction of the corresponding transmission signal. For example, the second variable amplifier 420b corresponding to the transmission signal ST1 changes an amplitude of a signal obtained by rotating the phase of the quadrature signal ST1-Q by 0° or 180° according to the transmission direction of the transmission signal ST1. Similarly, the second variable amplifiers 420b corresponding to the transmission signals ST2 to ST4 each change amplitudes of signals obtained by rotating the phases of the quadrature signals ST2-Q to ST4-Q by 0° or 180° according to the transmission directions of the transmission signals ST2 to ST4. Amplitude change rates (amplification rate) of the first variable amplifier 420a and the second variable amplifier 420b are set based on the weight W supplied from the controller 30.

The plurality of mixer units 50 are provided in correspondence with the plurality of phase control units 40, and each of mixer units 50 up-convert a frequency of the transmission signal of which the phase is controlled by the phase control unit 40. Each mixer unit 50 includes a first mixer 500a and a second mixer 500b. The first mixer 500a up-converts a frequency of the output signal of the first variable amplifier 420a using the local signal LO having a frequency higher than the frequencies of the transmission signals ST1 to ST4. The second mixer 500b up-converts a frequency of the output signal of the second variable amplifier 420b using the local signal LO. Each of the plurality of mixer units 50 uses the common local signal LO. The transmission signals ST1 to ST4 in the baseband region or the intermediate frequency band are up-converted into the RF band (or millimeter waveband) by the mixer unit 50. The frequency of the local signal LO is not particularly limited. However, for example, the frequency of the Local signal LO is about 25 GHz. The first mixer 500a and the second mixer 500b share (interconnect) a local terminal to which the local signal LO is input, and share (interconnect) an RF terminal from which an RF signal is output.

The combining unit 60 is a transmission path that connects the outputs of the plurality of mixer units 50 to each other. In other words, for example, the phase of each of the transmission signals ST1 to ST4 is controlled by the phase control unit 40 corresponding to each of transmission signals ST1 to ST4, and the frequency is converted by the mixer unit 50. Thereafter, the combining unit 60 synthesizes the transmission signals ST11 to ST4. As a result, the phase control circuits 20 each generate the output signals $S_{out1}$ to $S_{out8}$. The combining unit 60 is connected to the antenna element NA to which correspond, and the output signals $S_{out1}$ to $S_{out8}$ are radiated via the antenna elements AN.

By setting the phase rotation amounts of the first phase switching unit 410a and the second phase switching unit 410b, it is possible to switch phase quadrants of the transmission signals ST1 to ST4. The phase rotation amounts of the transmission signals ST1 to ST4 can be controlled within a range of 0° to 360° according to setting of the amplitude change rates (amplification rate) of the first variable amplifier 420a and the second variable amplifier 420b. In other words, for example, each of the phase control units 40 control the phase rotation amounts of the transmission signals ST1 to ST4 within the range of 0° to 360° by synthesizing vectors of the in-phase signals and the quadrature signals of which the phases have been switched and the amplitudes have been controlled.

For example, in a case where the phase rotation amounts of the transmission signals ST1 to ST4 are controlled within the range of 0° to 90° (first quadrant) by the phase control unit 40, 0° is selected as the phase rotation amount of the first phase switching unit 410a. Furthermore, in this case, 0° is selected as the phase rotation amount of the second phase switching unit 410b. It is possible to control the phase rotation amounts of the transmission signals ST1 to ST4 within the range of 0° to 90° according to a ratio of the amplification rates of the first variable amplifier 420a and the second variable amplifier 420b.

Furthermore, for example, in a case where the phase rotation amounts of the transmission signals ST1 to ST4 are controlled within the range of 90° to 180° (second quadrant) by the phase control unit 40, 180° is selected as the phase rotation amount of the first phase switching unit 410a. Furthermore, in this case, 0° is selected as the phase rotation amount of the second phase switching unit 410b. It is possible to control the phase rotation amounts of the transmission signals ST1 to ST4 within the range of 90° to 180° according to the ratio of the amplification rates of the first variable amplifier 420a and the second variable amplifier 420b.

Furthermore, for example, in a case where the phase rotation amounts of the transmission signals ST1 to ST4 are controlled within the range of 180° to 270° (third quadrant) by the phase control unit 40, 180° is selected as the phase rotation amount of the first phase switching unit 410a. Furthermore, in this case, 180° is selected as the phase rotation amount of the second phase switching unit 410b. It is possible to control the phase rotation amounts of the transmission signals ST1 to ST4 within the range of 180° to 270° according to the ratio of the amplification rates of the first variable amplifier 420a and the second variable amplifier 420b.

Furthermore, for example, in a case where the phase rotation amounts of the transmission signals ST1 to ST4 are controlled within the range of 270° to 360° (fourth quadrant) by the phase control unit 40, 0° is selected as the phase rotation amount of the first phase switching unit 410a. Furthermore, in this case, 180° is selected as the phase rotation amount of the second phase switching unit 410b. It is possible to control the phase rotation amounts of the transmission signals ST1 to ST4 within the range of 270° to 360° according to the ratio of the amplification rates of the first variable amplifier 420a and the second variable amplifier 420b.

Furthermore, by changing the amplification rates of the first variable amplifier 420a and the second variable amplifier 420b while fixing the ratio of the amplification rates of the first variable amplifier 420a and the second variable amplifier 420b, the amplitudes of the transmission signals ST1 to ST4 can be changed. In other words, for example, all elements of the weight W can weight, not only the phase but also the amplitude. For example, by weighting the amplitude, a beam shape such as a beam width of each of the transmission beams B1 to B4 can be independently changed.

Here, according to the wireless device 10X in the first reference example illustrated in FIG. 1, the transmission signals ST1 to ST4 transmitted to the respective terminals are distributed to the plurality of phase control circuits 20X after being up-converted to the RF band using the local signal LO. According to the wireless device 10X in the first reference example, 32 signal lines are provided between four DACs 12 and the eight phase control circuits 20X, and signals in the RF band of which a frequency is relatively high are transmitted through these signal lines. Therefore, a loss of the signals increases.

On the other hand, according to the wireless device 10 in the embodiment of the disclosed technique, the distribution of the transmission signals ST1 to ST4 to the phase control circuits 20 is performed in the baseband region or the intermediate frequency band having a relatively low frequency. Therefore, according to the wireless device 10 including the phase control circuits 20 in the embodiment of the disclosed technique, the loss of the signals can be reduced in comparison with the wireless device 10X including the phase control circuits 20X in the first reference example.

Figure 5:
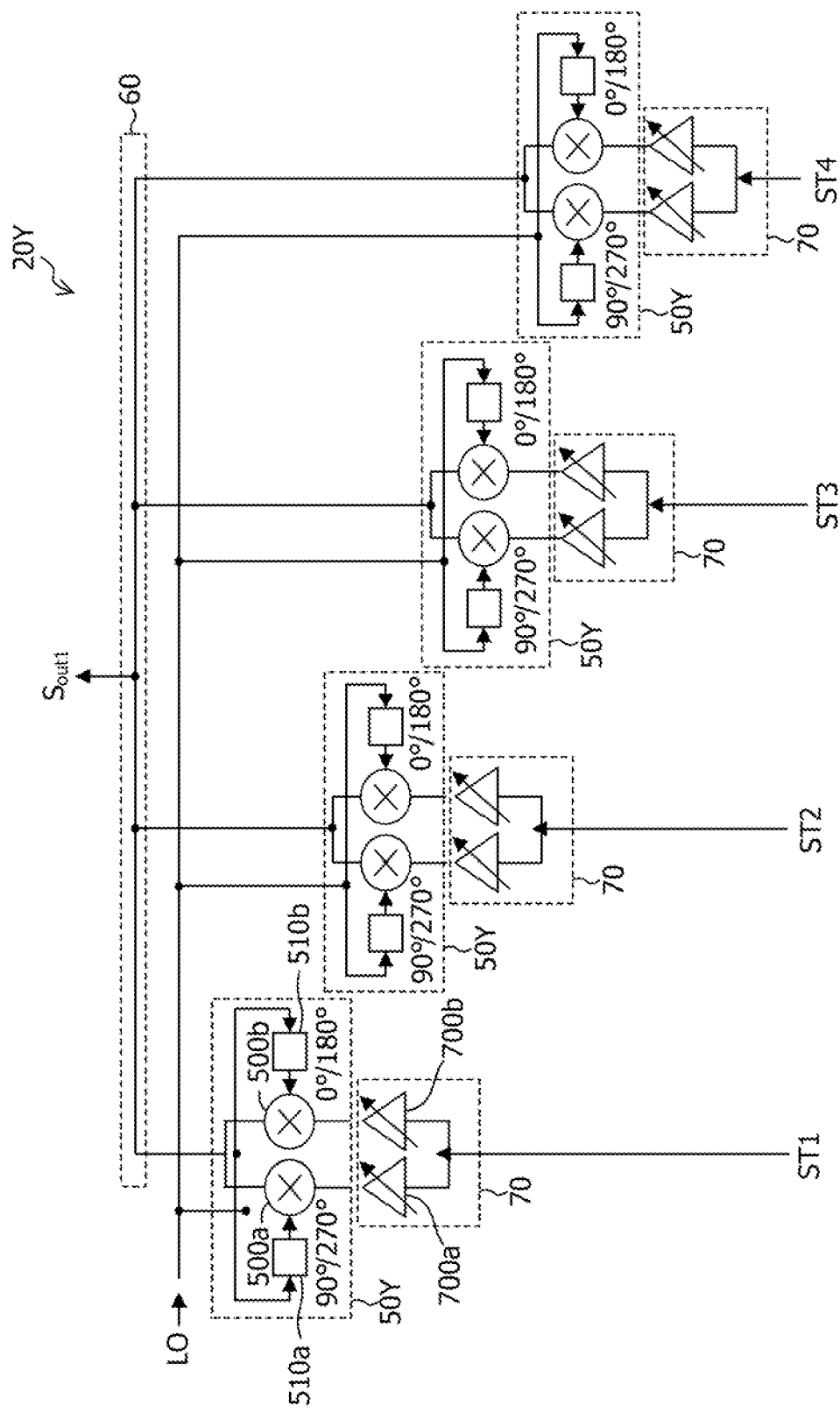
FIG. 5 is a diagram illustrating an example of a configuration of a phase control circuit according to a second reference example.

FIG. 5 is a diagram illustrating an example of a configuration of a phase control circuit 20Y according to a second reference example. The phase control circuit 20Y is provided in correspondence with each of the plurality of antenna elements AN. The phase control circuit 20Y has functions similar to those of the phase control circuit 20 according to the embodiment of the above-disclosed technique. The phase control circuit 20Y includes a plurality of amplitude control units 70, a plurality of mixer units 50Y, and a combining unit 60. The plurality of amplitude control units 70 and the plurality of mixer units SOY are provided in correspondence with the respective transmission signals ST1 to ST4.

Each amplitude control unit 70 changes an amplitude of the transmission signal according to the transmission direction of the transmission signal. The amplitude control unit 70 each includes a first variable amplifier 700a and a second variable amplifier 700b. In each amplitude control unit 70, the transmission signal is branched into two. One of the divided signals is supplied to the first variable amplifier 700a, and the other is supplied to the second variable amplifier 700b.

The first variable amplifier 700a and the second variable amplifier 700b each change the amplitudes of the transmission signals according to the transmission directions of the transmission signals. For example, the first variable amplifier 700a and the second variable amplifier 700b corresponding to the transmission signal ST1 change the amplitude of the transmission signal ST1 according to the transmission direction of the transmission signal ST1. Amplitude change rates (amplification rate) of the first variable amplifier 700a and the second variable amplifier 700b are set based on the weight W supplied from the controller 30.

Each of the plurality of mixer units 50Y includes a first phase switching unit 510a, a second phase switching unit 510b, a first mixer 500a, and a second mixer 500b. Each of the first phase switching unit 510a and the second phase switching unit 510b selectively switches the phase rotation amount of the local signal LO according to the transmission direction of the transmission signal. Each of the first phase switching unit 510a and the second phase switching unit 510b rotates the phase of the local signal LO by the selected rotation amount. The phase rotation amount of the first phase switching unit 510a is set to either one of 90° or 270° on the basis of the weight W supplied from the controller 30. The phase rotation amount of the second phase switching unit 510b is set to either one of 0° or 180° on the basis of the weight W supplied from the controller 30.

The first mixer 500a up-converts a frequency of the output signal of the first variable amplifier 700a using the local signal LO of which the phase is rotated by the first phase switching unit 510a. The second mixer 500b up-converts a frequency of the output signal of the second variable amplifier 700b using the local signal LO of which the phase is rotated by the second phase switching unit 510b. The mixer unit 50Y up-converts the transmission signals ST1 to ST4 in the baseband region or the intermediate frequency band to the RF band (or millimeter waveband).

The amplitude of each of the transmission signals ST1 to ST4 is controlled by the amplitude control unit 70, and the frequency is converted by the mixer unit 50Y. Thereafter, the transmission signals ST1 to ST4 are synthesized by the combining unit 60. As a result, the phase control circuits 20Y each generate the output signals $S_{out1}$ to $S_{out8}$. Note that, in FIG. 5, the phase control circuit 20Y that outputs the output signal $S_{out1}$ is illustrated. The combining unit 60 is connected to the antenna element NA, and the output signals $S_{out1}$ to $S_{out8}$ are radiated from the antenna elements AN to which correspond.

By setting the phase rotation amounts of the first phase switching unit 510a and the second phase switching unit 510b, it is possible to switch phase quadrants of the transmission signals ST1 to ST4. The phase rotation amounts of the transmission signals ST1 to ST4 can be controlled within a range of 0° to 360° according to setting of the amplitude change rates (amplification rate) of the first variable amplifier 700a and the second variable amplifier 700b.

According to the phase control circuit 20Y in the second reference example, it is possible to form transmission beams toward the terminals 101 to 104, similarly to the phase control circuit 20 in the embodiment of the disclosed technique. Furthermore, the transmission signals ST1 to ST4 are distributed to the phase control circuits 20Y in the baseband region or the intermediate frequency band where the frequency is relatively low. Therefore, a loss of the signals can be reduced in comparison with the wireless device 10X according to the first reference example illustrated in FIG. 1.

Figure 6:
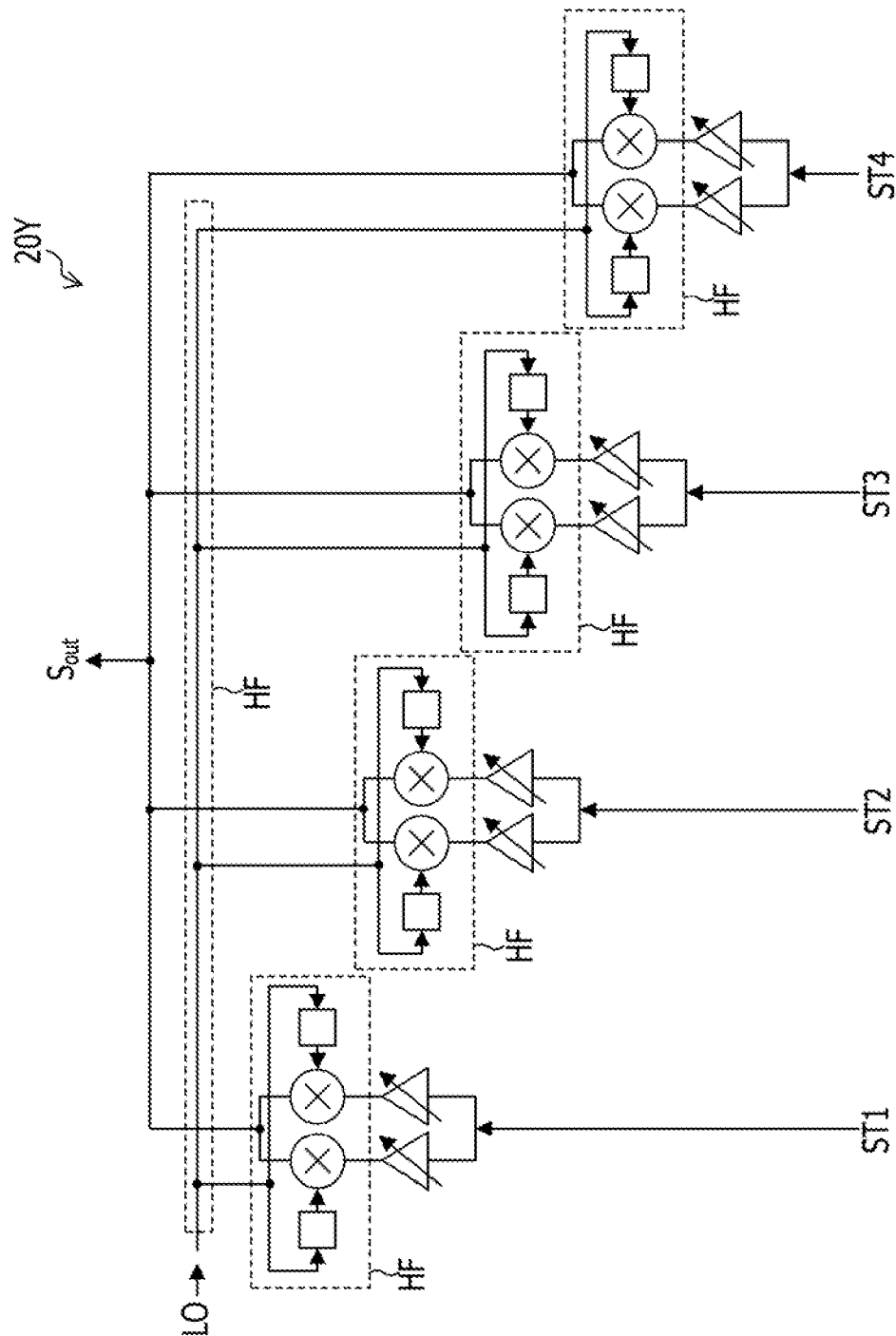
FIG. 6 is a diagram illustrating an example of the configuration of the phase control circuit according to the second reference example.

However, according to the phase control circuit 20Y in the second reference example, as illustrated in FIG. 6, the number of high frequency blocks HF through which the local signal LO having the relatively high frequency is transmitted increases. As illustrated in FIG. 5, for example, in a case where the four transmission signals ST1 to ST4 are used, the number of high frequency blocks HF is five. It is needed for each high frequency block HF to include a distributed constant circuit having a size according to a wavelength of a high frequency signal. Therefore, it is difficult to reduce the circuit size (occupied area of circuit) of the phase control circuit 20Y in the second reference example. For example, in a case where the above circuit is configured on a semiconductor circuit chip, if the radio-frequency wavelength and the size of the semiconductor circuit chip become close to each other, the plurality of high frequency blocks HFs occupies most of a region in a semiconductor chip, and in addition, a chip area increases.

Figure 7:
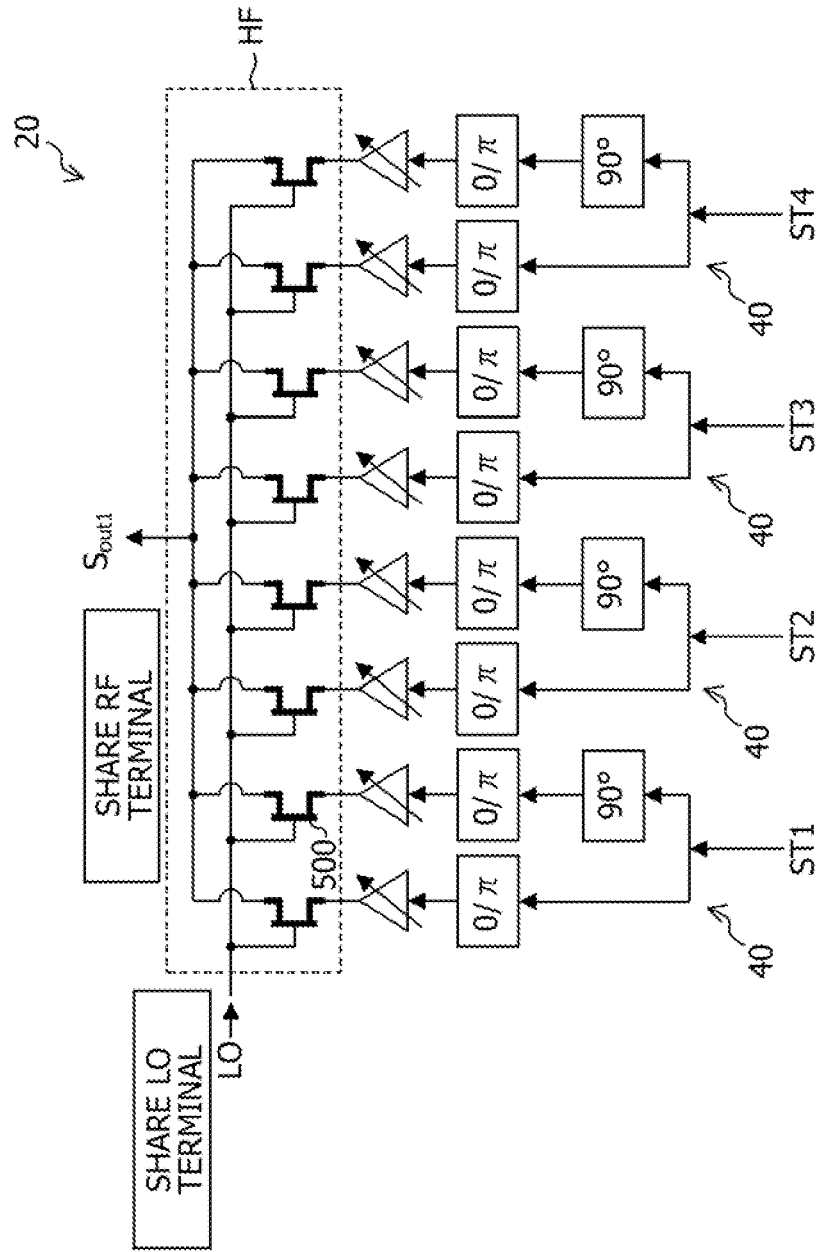
FIG. 7 is a diagram illustrating an example of the configuration of the phase control circuit according to the embodiment of the disclosed technique.

On the other hand, according to the phase control circuit 20 in the embodiment of the disclosed technique, as illustrated in FIG. 7, the number of high frequency blocks HF can be set to one. Furthermore, each mixer included in the mixer unit can be configured by a transistor 500. Each of the transistors 500 has a common drain (or source) connected to the combining unit 60 and have a common gate to which the local signal LO is supplied. Therefore, the transistor 500 configuring the mixer can include a single drain electrode (or source electrode), a single gate electrode, and a single multi-finger type transistor including a plurality of separate source electrodes (or drain electrode). This makes it possible to make the plurality of mixer units 50 be exceedingly compact. In other words, for example, according to the phase control circuit 20 in the embodiment of the disclosed technique, the circuit size (occupied area of circuit) can be reduced in comparison with the phase control circuit 20Y in the second reference example.

Furthermore, according to the phase control circuit 20 in the embodiment of the disclosed technique, the transmission signals ST1 to ST4 transmitted to the phase control units 40 are signals in the baseband region or the intermediate frequency band having a relatively low frequency. Therefore, a passive circuit of the phase control unit 40 can be configured to include a lumped parameter circuit or a circuit similar to the lumped parameter circuit. Here, the "circuit similar to the lumped parameter circuit" is a circuit that includes an element like a distributed constant circuit such as a spiral inductor or a meander inductor and that can be configured to have a small area. By configuring the passive element of the phase control unit 40 using the lumped parameter circuit or the circuit similar to the lumped parameter circuit, it is possible to reduce the circuit size (occupied area of circuit) of the phase control circuit 20 to be relatively small.

Figure 8:
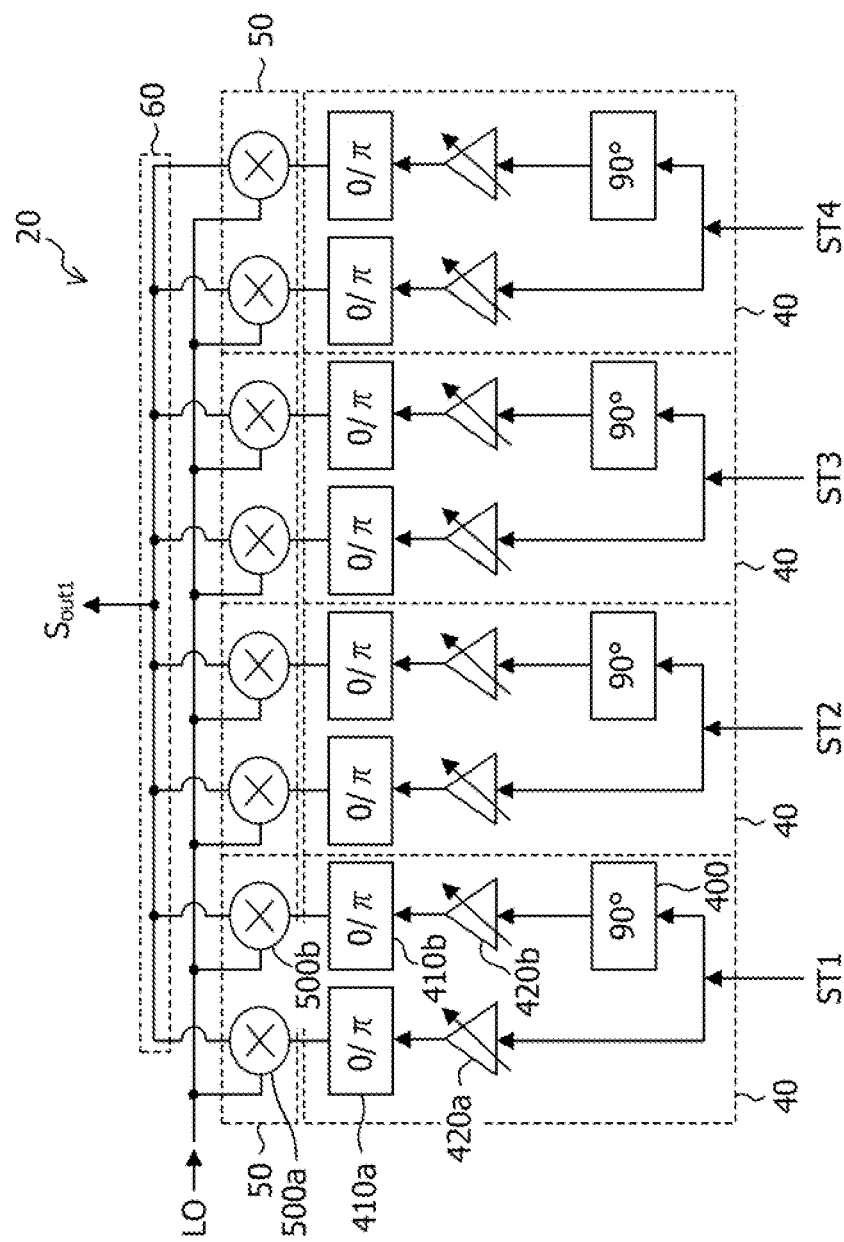
FIG. 8 is a diagram illustrating an example of the configuration of the phase control circuit according to the embodiment of the disclosed technique.

Note that, in FIG. 4, the configuration is illustrated in which the first variable amplifier 420a and the second variable amplifier 420b are arranged on the output sides of the first phase switching unit 410a and the second phase switching unit 410b, respectively. However, the arrangement is not limited to this. In other words, for example, as illustrated in FIG. 8, the first variable amplifier 420a and the second variable amplifier 420b can be arranged on the input sides of the first phase switching unit 410a and the second phase switching unit 410b, respectively.

Second Embodiment

Figure 9:
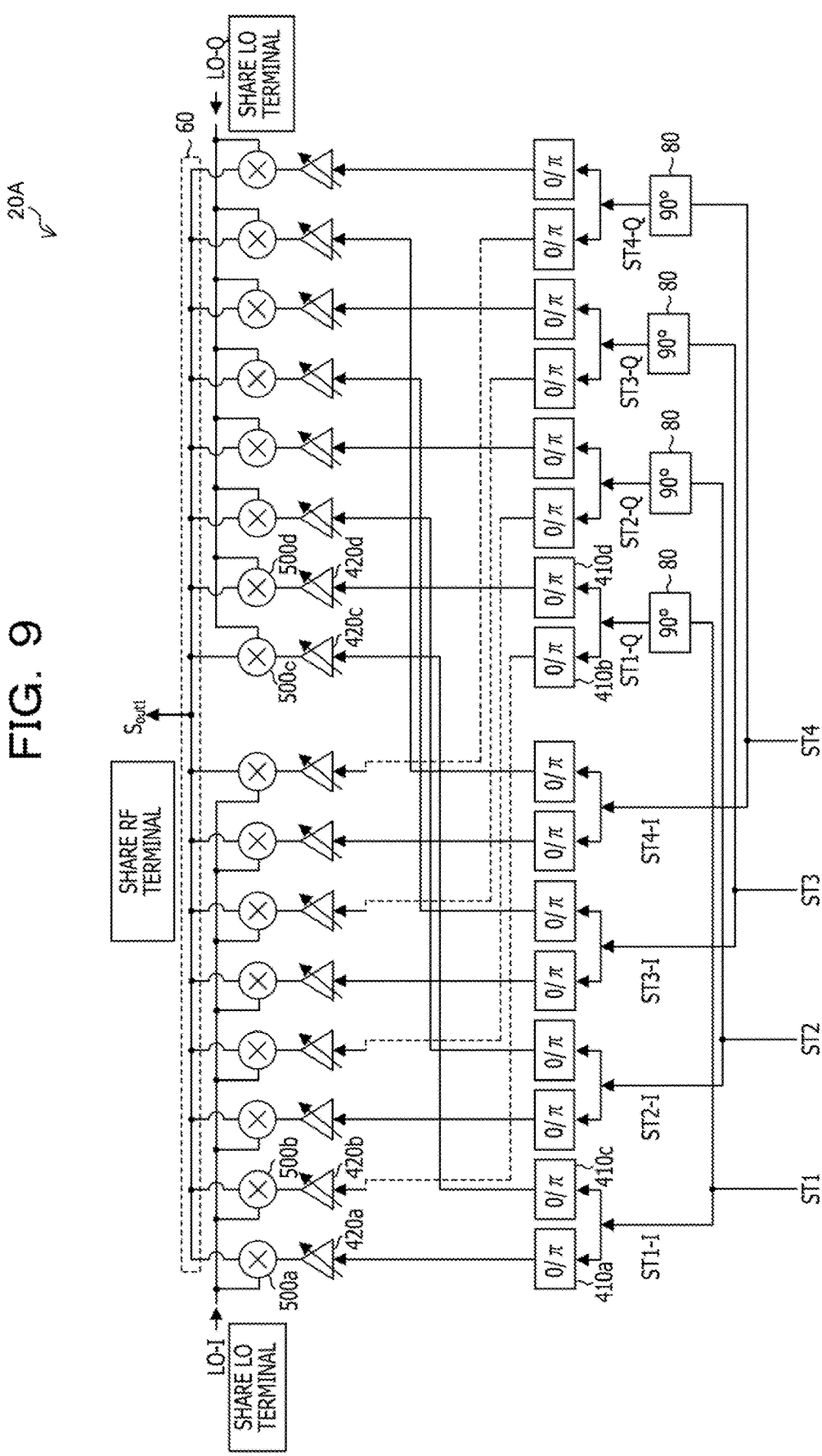
FIG. 9 is a diagram illustrating an example of a configuration of a phase control circuit according to a second embodiment of the disclosed technique.

FIG. 9 is a diagram illustrating an example of a configuration of a phase control circuit 20A according to a second embodiment of the disclosed technique. The phase control circuit 20A is provided in correspondence with each of a plurality of antenna elements AN.

The phase control circuit 20A includes a plurality of phase rotation units 80. The plurality of phase rotation units 80 is provided in correspondence with transmission signals ST1 to ST4, respectively. The phase rotation unit 80 rotates a phase of the corresponding transmission signal by 90°. In other words, for example, the phase rotation unit 80 corresponding to the transmission signal ST1 outputs a quadrature signal ST1-Q. Similarly, the phase rotation units 80 corresponding to the transmission signals ST2 to ST4 each output quadrature signals ST2-Q to ST4-Q.

In the phase control circuit 20A, each of a plurality of phase control units provided in correspondence with the transmission signals ST1 to ST4 include a first to fourth phase switching units 410a to 410d and a first to fourth variable amplifiers 420a to 420d.

Each of the first and the third phase switching units 410a and 410c selectively switches a phase rotation amount of an in-phase signal according to a transmission direction of the transmission signal. The first and the third phase switching units 410a and 410c rotate a phase of the in-phase signal by the selected rotation amount. For example, the first and the third phase switching units 410a and 410c corresponding to the transmission signal ST1 selectively switch a phase rotation amount of an in-phase signal ST1-I according to the transmission direction of the transmission signal ST1 and rotates a phase of the in-phase signal ST1-I.

Each of the second and the fourth phase switching units 410b and 410d selectively switches a phase rotation amount of a quadrature signal according to transmission directions of the transmission signals. The second and the fourth phase switching units 410b and 410d rotate a phase of the quadrature signal by the selected rotation amount. For example, the second and the fourth phase switching units 410b and 410d corresponding to the transmission signal ST1 selectively switch a phase rotation amount of a quadrature signal ST1-Q according to the transmission direction of the transmission signal ST1 and rotates a phase of the in-phase signal ST1-Q. The phase rotation amounts of the first to the fourth phase switching units 410a to 410d are set to ether one of 0° or 180° on the basis of a weight W supplied from a controller 30.

The first variable amplifier 420a changes an amplitude of the output signal of the first phase switching unit 410a according to the transmission direction of the transmission signal. Similarly, the second to the fourth variable amplifiers 420b to 420d each change amplitudes of output signals of the second to the fourth phase switching units 410b to 410d according to the transmission directions of the transmission signals. Amplitude change rates (amplification rate) of the first to the fourth variable amplifiers 420a to 420d are set based on the weight W supplied from the controller 30.

In the phase control circuit 20A, a plurality of mixer units provided in correspondence the transmission signals ST1 to ST4 each include a first to a fourth mixers 500a to 500d. The first mixer 500a up-converts a frequency of the output signal of the first variable amplifier 420a using a first local signal LO-I having a frequency higher than frequencies of the transmission signals ST1 to ST4. The second mixer 500b up-converts a frequency of the output signal of the second variable amplifier 420b using the first local signal LO-I. In other words, for example, the first mixer 500a and the second mixer 500b up-convert the frequencies using the common first local signal LO-I.

The third mixer 500c up-converts a frequency of the output signal of the third variable amplifier 420c using a second local signal LO-Q obtained by rotating a phase of the first local signal LO-I by 90°. The fourth mixer 500d up-converts a frequency of the output signal of the fourth variable amplifier 420d using the second local signal LO-Q. In other words, for example, the third mixer 500c and the fourth mixer 500d up-convert the frequencies using the common second local signal LO-Q.

The phases of the transmission signals ST1 to ST4 are controlled by the phase control units (first to fourth phase switching units 410a to 410d and first to fourth variable amplifiers 420a to 420d) respectively, and the frequencies are converted by the mixer units (first to fourth mixers 500a to 500d). Thereafter, the transmission signals ST1 to ST4 are synthesized by a combining unit 60. With this operation, in each of the phase control circuits 20A, the output signals $S_{out1}$ to $S_{out8}$ is generated. The combining unit 60 is connected to the antenna element NA to which correspond, and the output signals $S_{out1}$ to $S_{out8}$ are radiated from the antenna elements AN. Note that FIG. 9 illustrates the phase control circuit 20A that outputs the output signal $S_{out1}$.

Here, when the transmission signals ST1 to ST4 in a baseband region or an intermediate frequency band are mixed with the local signal using the mixers so as to up-convert the frequencies of the transmission signals ST1 to ST4, an image signal is mixed into the output signal of the mixer. The image signal is a disturbing signal generated in a frequency band that is symmetrically provided with a desired signal with respect to a frequency band of the local signal. It is possible to reduce the image signals by mixing in-phase signals ST1-I to ST4-I, quadrature signals ST1-Q to ST4-Q, and the two local signals LO-I and LO-Q orthogonal to each other with the mixer, and then, combining the signals.

The phase control circuit 20A has a configuration in which the third and the fourth phase switching units 410c and 410d, the third and the fourth variable amplifiers 420c and 420d, and the third and the fourth mixers 500c and 500d are added to the phase control circuit 20 in the first embodiment. With this configuration, because the processing is performed for mixing the in-phase signals ST1-I to ST4-I, the quadrature signals ST1-Q to ST4-Q, and the two local signals LO-I and LO-Q orthogonal to each other and combining the signals, it is possible to reduce the image signals.

In the phase control circuit 20A, the in-phase signals ST1-I to ST4-I and the quadrature signals ST1-Q to ST4-Q are used to switch four quadrants of the phases of the transmission signals ST1 to ST4 and also used to reduce the image signals. In this way, by using the in-phase signals and the quadrature signals to control the phases and to reduce the image signals, it is possible to suppress an increase in a circuit size (occupied area of circuit).

Furthermore, according to the phase control circuit 20A, similarly to the phase control circuit 20 in the first embodiment, the transmission signals ST1 to ST4 are distributed to the phase control circuits 20A in the baseband region or the intermediate frequency band where the frequency is relatively low. Therefore, according to a wireless device 10 including the phase control circuit 20A, a loss of signals can be reduced in comparison with the wireless device 10X in the first reference example. Furthermore, according to the phase control circuit 20A, because the number of high frequency blocks HF can be reduced similarly to the phase control circuit 20 in the first embodiment, an increase in a circuit size (occupied area of circuit) can be suppressed. Furthermore, the first mixer 500a and the second mixer 500b share (interconnect) a local terminal to which the first local signal LO-I is input, and the third mixer 500c and the fourth mixer 500d share (interconnect) a local terminal to which the second local signal LO-Q is input. Moreover, the first to the fourth mixers 500a to 500d share (interconnect) an RF terminal from which an RF signal is output. As a result, the mixer unit can be configured by, for example, a multi-finger type transistor, and it is possible to configure the mixer unit to be exceedingly compact.

Note that, as in the example illustrated in FIG. 8, the first to the fourth variable amplifiers 420a to 420d can be arranged on the input sides of the first to the fourth phase switching units 410a to 410d, respectively.

Third Embodiment

Figure 10:
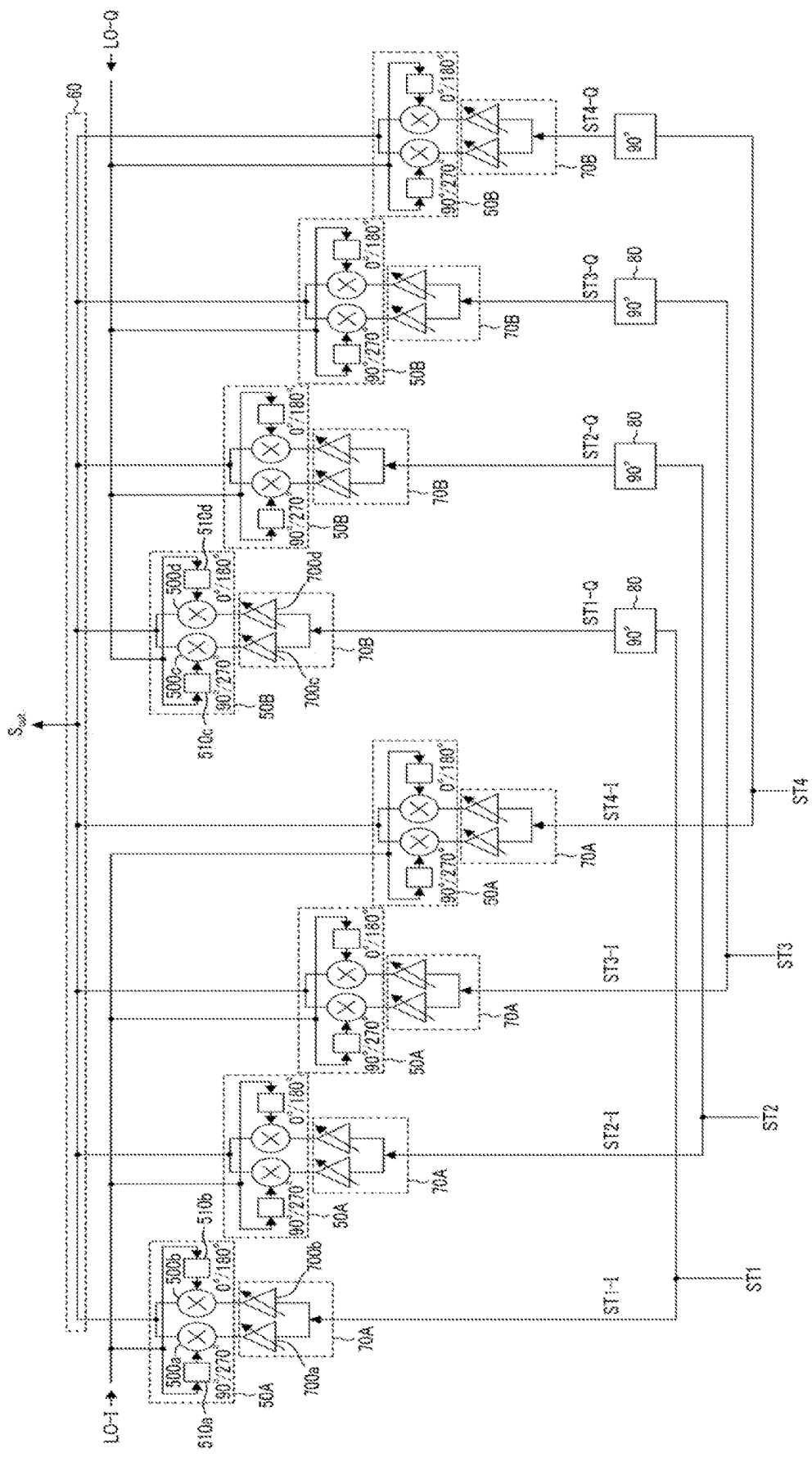
FIG. 10 is a diagram illustrating an example of a configuration of a phase control circuit according to a third embodiment of the disclosed technique.

FIG. 10 is a diagram illustrating an example of a configuration of a phase control circuit 20B according to a third embodiment of the disclosed technique. The phase control circuit 206 is provided in correspondence with each of a plurality of antenna elements AN. The phase control circuit 20B has a configuration in which a function for reducing image signals is added to the phase control circuit 20Y in the second reference example illustrated in FIG. 5.

The phase control circuit 208 includes a plurality of phase rotation units 80, a plurality of first amplitude control units 70A, a plurality of second amplitude control units 70B, a plurality of first mixer units 50A, a plurality of second mixer units 50B, and a combining unit 60.

The plurality of phase rotation units 80 is provided in correspondence with transmission signals ST1 to ST4, respectively. The phase rotation unit 80 rotates a phase of the transmission signal by 90°. In other words, for example, the phase rotation unit 80 corresponding to the transmission signal ST1 outputs a quadrature signal ST1-Q. Similarly, the phase rotation units 80 corresponding to the transmission signals ST2 to ST4 each output quadrature signals ST2-Q to ST4-Q.

The plurality of first amplitude control units 70A and the plurality of first mixer units 50A are each provided in correspondence with the transmission signals ST1 to ST4. Similarly, the plurality of second amplitude control units 708 and the plurality of second mixer units 50B are each provided in correspondence with the transmission signals ST1 to ST4.

Each first amplitude control unit 70A changes an amplitude of the transmission signal. Each first amplitude control unit 70A includes a first variable amplifier 700a and a second variable amplifier 700b. In each first amplitude control unit 70A, the transmission signal is branched into two. One of the divided signals is supplied to the first variable amplifier 700a, and the other is supplied to the second variable amplifier 700b.

The first variable amplifier 700a and the second variable amplifier 700b each change the amplitudes of the transmission signals according to the transmission directions of the transmission signals. For example, each of the first variable amplifier 700a and the second variable amplifier 700b corresponding to the transmission signal ST1 changes an amplitude of an in-phase signal ST1-I having the same phase as the transmission signal ST1 according to a transmission direction of the transmission signal ST1. Amplitude change rates (amplification rate) of the first variable amplifier 700a and the second variable amplifier 700b are set based on the weight W supplied from the controller 30.

Each of the plurality of second amplitude control units 70B changes an amplitude of a quadrature signal obtained by rotating a phase of the transmission signal by 90°. Each second amplitude control unit 70B includes a third variable amplifier 700c and a fourth variable amplifier 700d. In the second amplitude control unit 70B, the quadrature signal is divided into two. One of the divided signal is supplied to the third variable amplifier 700c, and the other is supplied to the fourth variable amplifier 700d.

Each of the third variable amplifier 700c and the fourth variable amplifier 700d changes an amplitude of the quadrature signal according to the transmission direction of the transmission signal. For example, each of the third variable amplifier 700c and the fourth variable amplifier 700d corresponding to the transmission signal ST1 changes an amplitude of a quadrature signal ST1-Q obtained by rotating a phase of the transmission signal ST1 by 90° according to the transmission direction of the transmission signal ST1. Amplitude change rates (amplification rate) of the third variable amplifier 700c and the fourth variable amplifier 700d are set based on the weight W supplied from the controller 30.

Each of the plurality of first mixer units 50A includes a first phase switching unit 510a, a first mixer 500a, a second phase switching unit 510b, and a second mixer 500b. Each of the first phase switching unit 510a and the second phase switching unit 510b selectively switches a phase rotation amount of a first local signal LO-I according to the transmission direction of the transmission signal. The first phase switching unit 510a and the second phase switching unit 510b rotate a phase of the first local signal LO-I by the respectively selected rotation amount. The phase rotation amount of the first phase switching unit 510a is set to either one of 90° or 270° based on the weight W supplied from the controller 30. The phase rotation amount of the second phase switching unit 510b is set to either one of 0° or 180° based on the weight W supplied from the controller 30.

The first mixer 500a up-converts a frequency of the output signal of the first variable amplifier 700a using the first local signal LO-I of which the phase is rotated by the first phase switching unit 510a. The second mixer 500b up-converts a frequency of the output signal of the second variable amplifier 700b using the first local signal LO-I of which the phase is rotated by the second phase switching unit 510b. The transmission signals ST1 to ST4 in a baseband region or an intermediate frequency band are up-converted into an RF band (or millimeter waveband) by the plurality of first mixer units 50A.

Each of the plurality of second mixer units SOB includes a third phase switching unit 510c, a third mixer 500c, a fourth phase switching unit 510d, and a fourth mixer 500d. Each of the third phase switching unit 510c and the fourth phase switching unit 510d selectively switches a phase rotation amount of a second local signal LO-Q obtained by rotating a phase by 90° with respect to the first local signal LO-I according to the transmission direction of the transmission signal. The third phase switching unit 510c and the fourth phase switching unit 510d rotate a phase of the second local signal LO-Q by the respectively selected rotation amount. The phase rotation amount of the third phase switching unit 510c is set to either one of 90° or 270° based on the weight W supplied from the controller 30. The phase rotation amount of the fourth phase switching unit 510d is set to either one of 0° or 180° based on the weight W supplied from the controller 30.

The third mixer 500c up-converts a frequency of the output signal of the third variable amplifier 700c using the second local signal LO-Q of which the phase is rotated by the third phase switching unit 510c. The fourth mixer 500d up-converts a frequency of the output signal of the fourth variable amplifier 700d using the second local signal LO-Q of which the phase is rotated by the fourth phase switching unit 510d. The transmission signals ST1 to ST4 in the baseband region or the intermediate frequency band are up-converted into the RF band (or millimeter waveband) by the plurality of second mixer units SOB.

An amplitude of each of the transmission signals ST1 to ST4 is controlled by the first amplitude control unit 70A and second amplitude control unit 708, and the frequency is converted by the first mixer unit 50A and second mixer unit 50B. Thereafter, the signals are combined by the combining unit 60. With this operation, the phase control circuits 20B each generate output signals $S_{out1}$ to $S_{out8}$. Note that FIG. 10 illustrates the phase control circuit 20B that outputs the output signal $S_{out1}$. The combining unit 60 is connected to the antenna element NA to which correspond, and the output signals $S_{out1}$ to $S_{out8}$ are radiated from the antenna elements AN.

By setting the phase rotation amounts of the first to the fourth phase switching units 510a to 510d, it is possible to switch phase quadrants of the transmission signals ST1 to ST4. The phase rotation amounts of the respective transmission signals can be controlled within the range of 0° to 360° according to setting of the amplitude change rates (amplification rate) of the first to the fourth variable amplifiers 700a to 700d.

According to the phase control circuit 20B, similarly to the phase control circuit 20 in the first embodiment of the disclosed technique, it is possible to form a transmission beam toward each terminal. Furthermore, the transmission signals ST1 to ST4 are distributed to the phase control circuits 20B in the baseband region or the intermediate frequency band where the frequency is relatively low. Therefore, a loss of the signals can be reduced in comparison with the wireless device 10X in the first reference example (refer to FIG. 1).

Furthermore, the phase control circuit 20B has a configuration in which the phase rotation unit 80, the third phase switching unit 510c, the fourth phase switching unit 510d, the third variable amplifier 700c, the fourth variable amplifier 700d, the third mixer 500c, and the fourth mixer 500d are added to the phase control circuit 20Y (refer to FIG. 5) in the second reference example. With this configuration, because the processing is performed for mixing the in-phase signals ST1-I to ST4-I, the quadrature signals ST1-Q to ST4-Q and the two local signals LO-I and LO-Q orthogonal to each other and combining the signals, it is possible to reduce the image signals.

Fourth Embodiment

Figure 11:
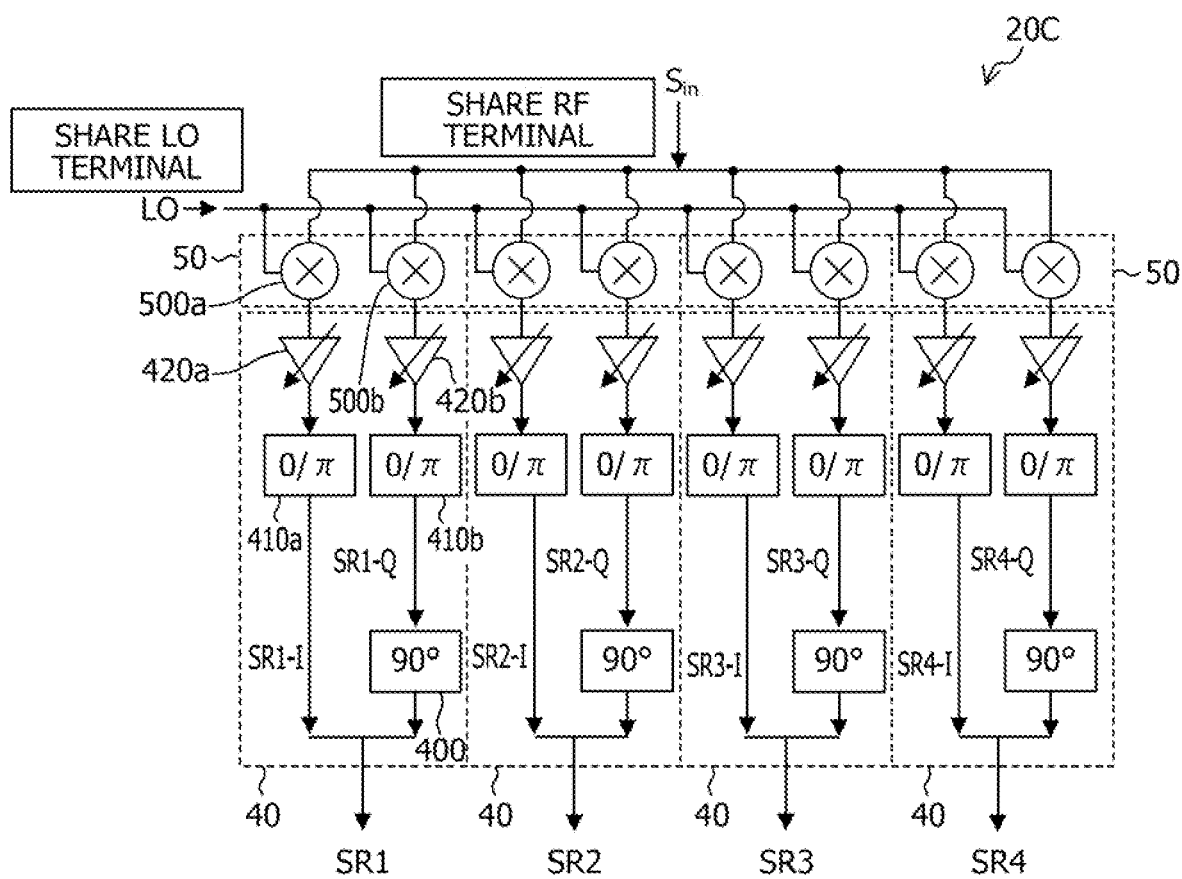
FIG. 11 is a diagram illustrating an example of a configuration of a phase control circuit according to a fourth embodiment of the disclosed technique.

FIG. 11 is a diagram illustrating an example of a configuration of a phase control circuit 20C in a fourth embodiment of the disclosed technique. The phase control circuit 20C is provided in correspondence with each of a plurality of antenna elements AN. The phase control circuits 20, 20A, and 20B according to the above-described first to the third embodiments have the function for forming the transmission beams B1 to B4 toward the terminals 101 to 104 to transmit the transmission signals ST1 to ST4. On the other hand, the phase control circuit 20C according to the present embodiment has a function for forming a reception beam to receive signals (hereinafter, referred to as reception signals SR1 to SR4) transmitted from the terminals 101 to 104.

The phase control circuit 20C has a configuration corresponding to the phase control circuit 20 (refer to FIG. 4) according to the first embodiment. In other words, for example, the phase control circuit 20C includes a plurality of phase control units 40 and a plurality of mixer units 50. The plurality of phase control units 40 and the plurality of mixer units 50 are provided in correspondence with each of the reception signals SR1 to SR4. The phase control circuit 20C receives an input signal $S_{in}$ obtained by combining the reception signals SR1 to SR4 transmitted from the terminals 101 to 104, respectively via the corresponding antenna element AN. The input signal $S_{in}$ is distributed to the plurality of mixer units 50.

The plurality of mixer units 50 is provided in correspondence with each of the reception signals SR1 to SR4, and each mixer unit 50 down-converts a frequency of the input signal $S_{in}$ obtained by combining the reception signals SR1 to SR4. Each mixer unit 50 includes a first mixer 500a and a second mixer 500b. Each of the first mixer 500a and the second mixer 500b down-converts the frequency of the input signal $S_{in}$ in an RF band (or millimeter waveband) to a baseband region or an intermediate frequency band using a local signal LO.

The plurality of phase control units 40 is provided respectively in correspondence with the plurality of mixer units 50 and changes a phase of the signal of which the frequency is down-converted by the corresponding mixer unit 50 according to an arrival direction of the reception signal.

Each phase control unit 40 includes a phase rotation unit 400, a first phase switching unit 410a, a second phase switching unit 410b, a first variable amplifier 420a, and a second variable amplifier 420b.

The first variable amplifier 420a changes an amplitude of an output signal of the first mixer 500a according to the arrival direction of the corresponding reception signal. Similarly, the second variable amplifier 420b changes an amplitude of an output signal of the second mixer 500b according to the arrival direction of the corresponding reception signal. Amplitude change rates (amplification rate) of the first variable amplifier 420a and the second variable amplifier 420b are set based on the weight W supplied from the controller 30.

The first phase switching unit 410a selectively switches a rotation amount of the output signal of the first variable amplifier 420a according to the arrival direction of the reception signal. The first phase switching unit 410a rotates a phase of the output signal of the first variable amplifier 420a by the selected rotation amount and outputs the signal as an in-phase signal (SR1-I to SR4-I) of the reception signal.

The second phase switching unit 410b selectively switches a rotation amount of the output signal of the second variable amplifier 420b according to the arrival direction of the reception signal. The second phase switching unit 410b rotates a phase of the output signal of the second variable amplifier 420b by the selected rotation amount and outputs the signal as a quadrature signal (SR1-Q to SR4-Q) of the reception signal. The phase rotation amounts of the first phase switching unit 410a and the second phase switching unit 410b are set to either one of 0° or 180° on the basis of the weight W supplied from the controller 30.

The phase rotation unit 400 generates an in-phase signal of the reception signal by rotating a phase of the quadrature signal (S1-Q to S4-Q) that is the output signal of the second phase switching unit 410b by 90°. The output signal of the first phase switching unit 410a and the output signal of the phase rotation unit 400 are combined, and accordingly, the reception signals SR1 to SR4 are separately extracted.

In this way, a flow of the signal in the phase control circuit 20C is opposite to a flow of the signal in the phase control circuit 20 in the first embodiment, and a processing order is reversed. According to the phase control circuit 20C in the present embodiment, similarly to the phase control circuit 20 in the first embodiment, it is possible to reduce a loss of signals while suppressing an increase in a circuit size (occupied area of circuit). Furthermore, the first mixer 500a and the second mixer 500b share (interconnect) a local terminal to which the local signal LO is input and share (interconnect) an RF terminal to which the input signal $S_{in}$, which is an RF signal, is input. As a result, the mixer unit 50 can be configured by, for example, a multi-finger type transistor, and it is possible to configure the mixer unit 50 to be exceedingly compact.

Note that, as in the example illustrated in FIG. 8, the first variable amplifier 420a and the second variable amplifier 420b can be arranged on the output sides of the first phase switching unit 410a and the second phase switching unit 410b, respectively.

Fifth Embodiment

Figure 12:
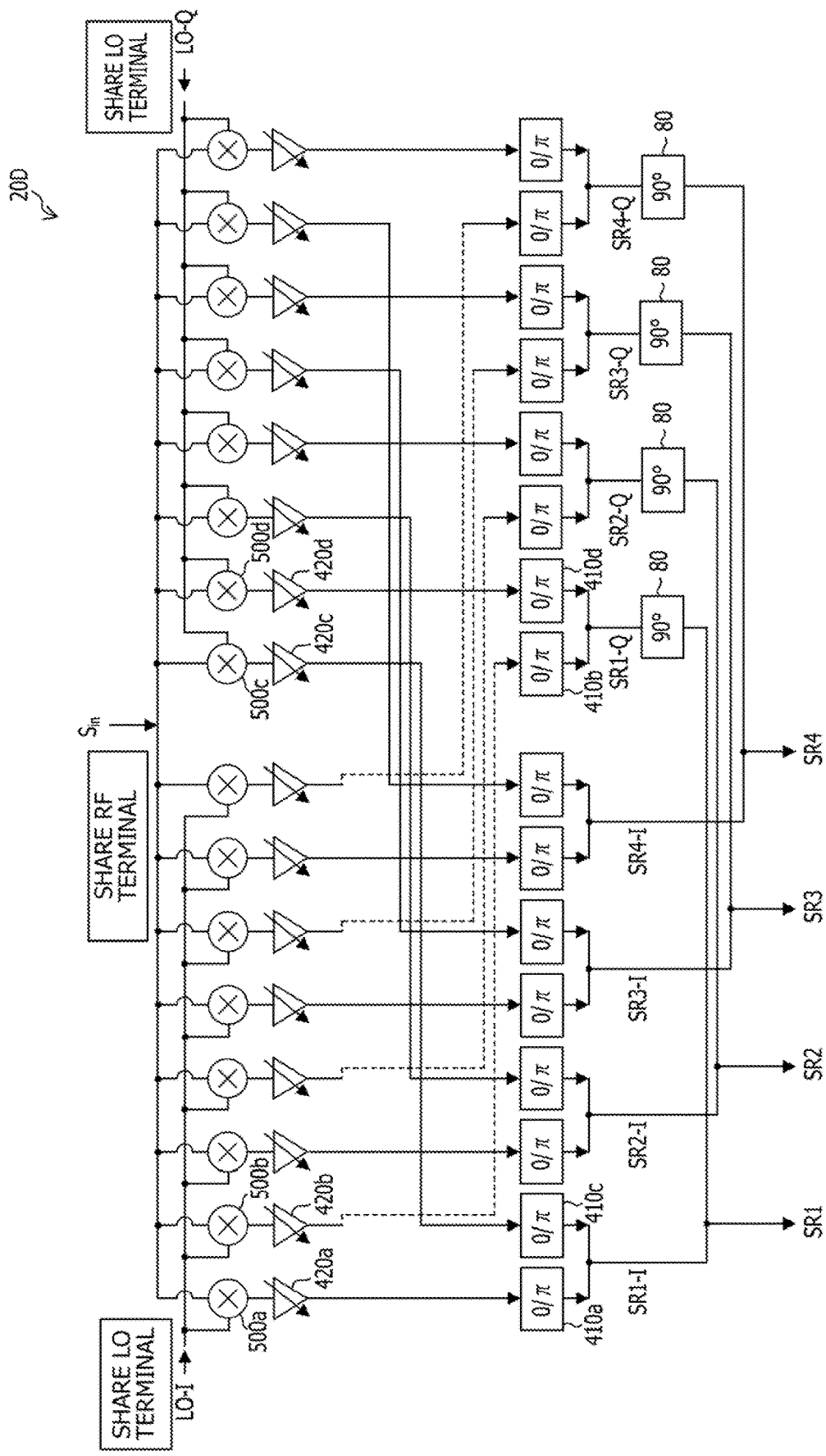
FIG. 12 is a diagram illustrating an example of a configuration of a phase control circuit according to a fifth embodiment of the disclosed technique.

FIG. 12 is a diagram illustrating an example of a configuration of a phase control circuit 20D according to a fifth embodiment of the disclosed technique. The phase control circuit 20D is provided in correspondence with each of a plurality of antenna elements AN. The phase control circuit 20D has a function for forming a reception beam to receive signals transmitted from terminals 101 to 104.

The phase control circuit 20D has a configuration corresponding to the phase control circuit 20A (refer to FIG. 9) according to the second embodiment. A flow of the signal in the phase control circuit 20D is opposite to the flow of the signal in the phase control circuit 20A in the second embodiment, and a processing order is reversed. The phase control circuit 20D receives an input signal $S_{in}$ obtained by combining reception signals SR1 to SR4 transmitted from the terminals 101 to 104, respectively and separately extracts the reception signals SR1 to SR4 included in the input signal $S_{in}$.

According to the phase control circuit 20D in the present embodiment, similarly to the phase control circuit 20A in the second embodiment, it is possible to reduce a loss of signals while suppressing an increase in a circuit size (occupied area of circuit), and in addition, image signals can be reduced. Furthermore, the first mixer 500a and the second mixer 500b share (interconnect) a local terminal to which the first local signal LO-I is input, and the third mixer 500c and the fourth mixer 500d share (interconnect) a local terminal to which the second local signal LO-Q is input. Moreover, the first to the fourth mixers 500a to 500d share (interconnect) an RF terminal to which the input signal $S_{in}$, which is an RF signal, is input. As a result, the mixer unit can be configured by, for example, a multi-finger type transistor, and it is possible to configure the mixer unit to be exceedingly compact.

Note that, as in the example illustrated in FIG. 8, a first to a fourth variable amplifiers 420a to 420d can be arranged on output sides of a first to a fourth phase switching units 410a to 410d, respectively.

Sixth Embodiment

Figure 13:
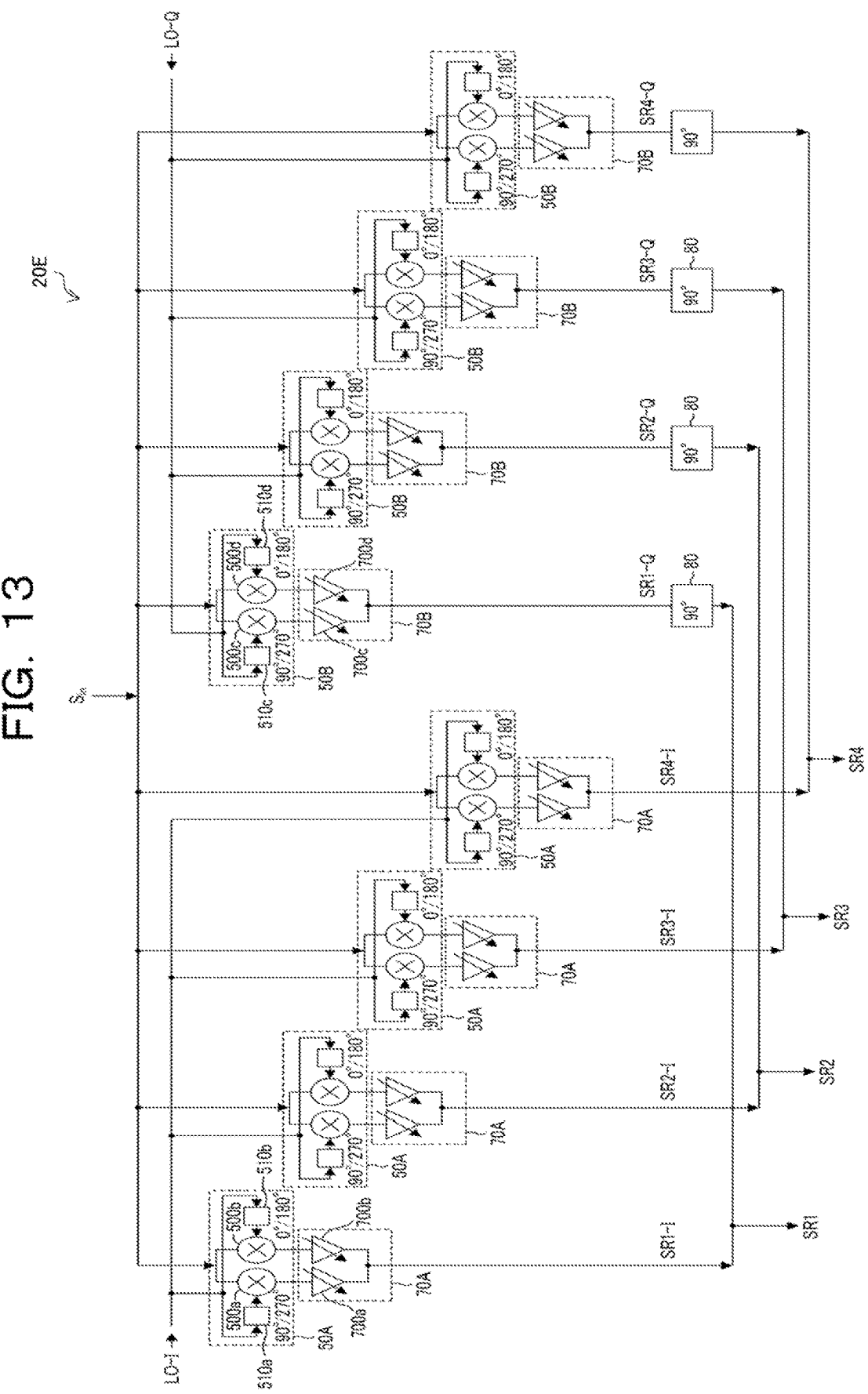
FIG. 13 is a diagram illustrating an example of a configuration of a phase control circuit according to a sixth embodiment of the disclosed technique.

FIG. 13 is a diagram illustrating an example of a configuration of a phase control circuit 20E according to a sixth embodiment of the disclosed technique. The phase control circuit 20E is provided in correspondence with each of a plurality of antenna elements AN. The phase control circuit 20E has a function for forming a reception beam to receive signals transmitted from terminals 101 to 104.

The phase control circuit 20E has a configuration corresponding to the phase control circuit 20B (refer to FIG. 10) in the third embodiment. A flow of the signal in the phase control circuit 20E is opposite to the flow of the signal in the phase control circuit 20B in the third embodiment, and a processing order is reversed. The phase control circuit 20E receives an input signal $S_{in}$ obtained by combining reception signals SR1 to SR4 transmitted from the terminals 101 to 104, respectively and separately extracts the reception signals SR1 to SR4 included in the input signal $S_{in}$.

According to the phase control circuit 20E in the present embodiment, similarly to the phase control circuit 20B in the third embodiment, it is possible to reduce a loss of signals, and in addition, image signals can be reduced.

Seventh Embodiment

Figure 14:
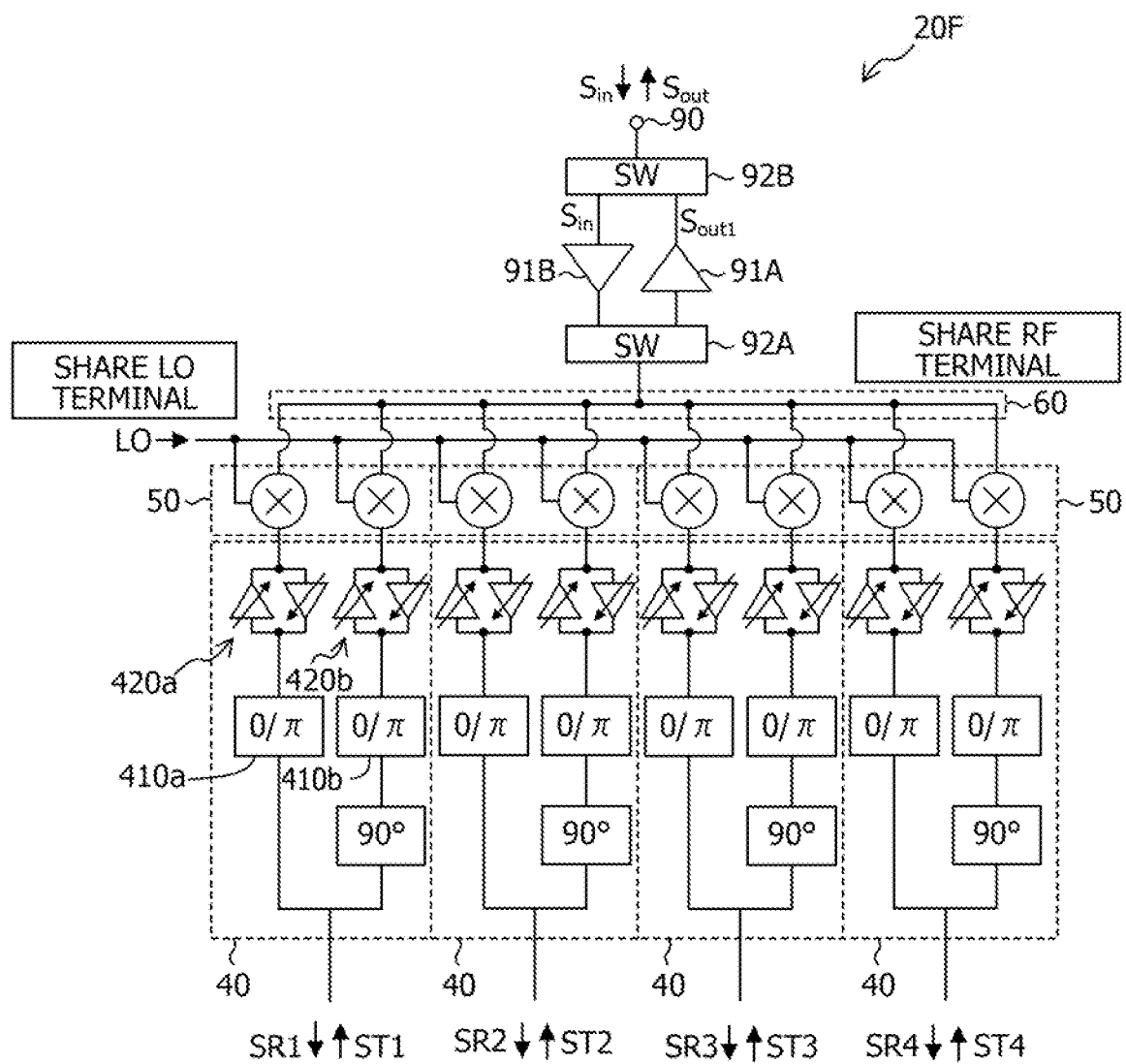
FIG. 14 is a diagram illustrating an example of a configuration of a phase control circuit according to a seventh embodiment of the disclosed technique.

FIG. 14 is a diagram illustrating an example of a configuration of a phase control circuit 20F according to a seventh embodiment of the disclosed technique. The phase control circuit 20F is provided in correspondence with each of a plurality of antenna elements AN. The phase control circuit 20F has a function for forming transmission beams B1 to B4 toward terminals 101 to 104 to transmit transmission signals and a function for forming reception beams to receive the signals transmitted from the terminals 101 to 104.

The phase control circuit 20F has a configuration corresponding to the phase control circuit 20 (refer to FIG. 4) in the first embodiment and the phase control circuit 20C (FIG. 11) in the fourth embodiment. The phase control circuit 20F includes a plurality of phase control units 40 and a plurality of mixer units 50. Each of the plurality of phase control units 40 and each of the plurality of mixer units 50 are provided in correspondence with each of the transmission signals ST1 to ST4 and each of reception signals SR1 to SR4.

In a case where the phase control circuit 20F transmits a signal, each phase control unit 40 controls a phase of the transmission signal according to a transmission direction of the transmission signal. Each mixer unit 50 up-convers a frequency of the transmission signal of which the phase is controlled by the phase control unit. Each of the output signals of the plurality of mixer units are combined by a combining unit 60, and an output signal $S_{out}$ is generated. The output signal $S_{out}$ is radiated via the antenna element AN to which correspond.

On the other hand, in a case where the phase control circuit 20F receives signals, an input signal $S_{in}$ obtained by combining the reception signals SR1 to SR4 transmitted from the terminals 101 to 104, respectively is distributed to each mixer unit 50. Each mixer unit 50 down-converts a frequency of the input signal $S_{in}$ obtained by combining the plurality of reception signals SR1 to SR4. Each phase control unit 40 changes a phase of the signal of which the frequency is down-converted by the corresponding mixer unit 50 according to an arrival direction of the reception signal.

The phase control circuit 20F includes a transmission amplifier 91A, a reception amplifier 91B, and switches 92A and 92B between an input/output terminal 90 and the combining unit 60. The transmission amplifier 91A is enabled in a case of transmitting a signal and amplifies an amplitude of the output signal $S_{out}$ output from the input/output terminal 90. The reception amplifier 91B is enabled in a case of receiving the signal and amplifies an amplitude of the input signal $S_{in}$ input to the input/output terminal 90.

Each of the switches 92A and 92B has a form of a Single-Pole Double-Throw (SPDT) switch and switches between a route through the transmission amplifier 91A and a route through the reception amplifier 91B. The switching of the switches 92A and 92B is controlled so that, in a case where a signal is transmitted, the route through the transmission amplifier 91A is selected, and in a case where a signal is received, the route through the reception amplifier 91B is selected.

In each phase control unit 40, each of a first variable amplifier 420a and a second variable amplifier 420b Includes a transmission variable amplifier and a reception variable amplifier that are connected in parallel. In a case of transmitting a signal, the transmission variable amplifier is enabled, and in a case of receiving a signal, the reception variable amplifier is enabled.

According to the phase control circuit 20F in the present embodiment, the mixer unit 50 and the phase control unit 40 are shared for signal transmission and signal reception. Therefore, a circuit size (occupied area of a circuit) can be reduced in comparison with a case where the mixer unit 50 and the phase control unit 40 are separately configured for transmission and for reception. Furthermore, the mixers included in the plurality of mixer units 50 share (interconnect) a local terminal to which the local signal LO is input and share (interconnect) an RF terminal to/from which an RF signal is input/output. As a result, the mixer unit 50 can be configured by, for example, a multi-finger type transistor, and it is possible to configure the mixer unit 50 to be exceedingly compact. Note that the first variable amplifier 420a and the second variable amplifier 420b can be arranged on either one the input sides and the output sides of a first phase switching unit 410a and a second phase switching unit 410b.

Eighth Embodiment

FIG. 15A is a diagram illustrating an example of a configuration of a phase control circuit 20G according to an eighth embodiment of the disclosed technique. The phase control circuit 20G is provided in correspondence with each of a plurality of antenna elements AN. The phase control circuit 20G has a function for forming transmission beams B1 to B4 toward terminals 101 to 104 to transmit transmission signals and a function for forming reception beams to receive the signals transmitted from the terminals 101 to 104. The phase control circuit 20G has a configuration corresponding to the phase control circuit 20A (refer to FIG. 9) in the second embodiment and the phase control circuit 20D (FIG. 12) in the fifth embodiment.

According to the phase control circuit 20G in the present embodiment, a mixer unit and a phase control unit are shared for signal transmission and signal reception. Therefore, a circuit size can be reduced in comparison with a case where the mixer unit and the phase control unit are separately configured for transmission and for reception. Furthermore, according to the phase control circuit 20G, image signals can be reduced. Furthermore, the first mixer 500a and the second mixer 500b share (interconnect) a local terminal to which the first local signal LO-I is input, and the third mixer 500c and the fourth mixer 500d share (interconnect) a local terminal to which the second local signal LO-Q is input. Moreover, the first to the fourth mixers 500a to 500d share (interconnect) an RF terminal to/from which an RF signal is input/output.

FIG. 15B is a diagram illustrating a case where each mixer in the phase control circuit 20G illustrated in FIG. 15A is configured by a transistor. Each mixer configured by a transistor 500 is a transistor shared for transmission and reception. Note that, in FIG. 15B, a bias circuit, a matching circuit, and the like are not illustrated. This type of mixer is called a resistive mixer (or switching mixer). A local signal is input to a gate of the transistor 500. A drain (or source) of the transistor 500 is the RF terminal from which the RF signal is output. The source (or drain) of the transistor 500 is an IF terminal to which output signals of a first to a fourth variable amplifiers 420a to 420d are input. In each transistor 500, potentials of the drain and the source are set to be the same in terms of a DC. This is the reason why this mixer is called a resistive mixer. A gate to which a first local signal LO-I is input is shared (interconnected), and a gate to which a second local signal LO-Q is input is shared (interconnected). The drain from which the RF signal is output is shared (Interconnected). The sources that are IF terminals separate from each other. In consideration of layout, this is a configuration in which only the sources are separated in a single-transistor layout including eight (or multiples of eight) gate fingers. The eight gate fingers can be used as a single circuit block, and the layout can be made exceedingly compact.

Ninth Embodiment

Figure 16:
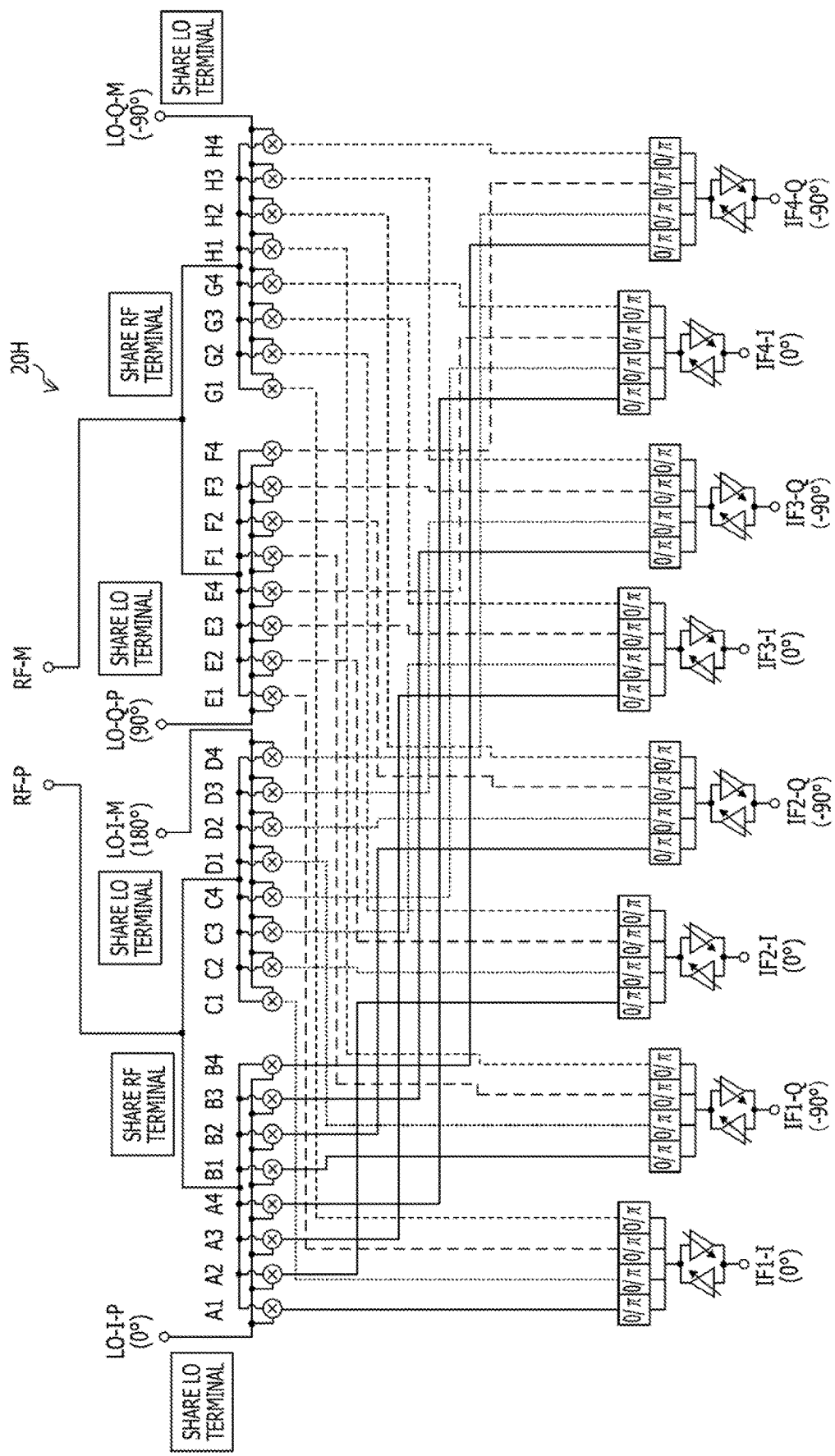
FIG. 16 is a diagram illustrating an example of a configuration of a phase control circuit according to a ninth embodiment of the disclosed technique.
Figure 17:
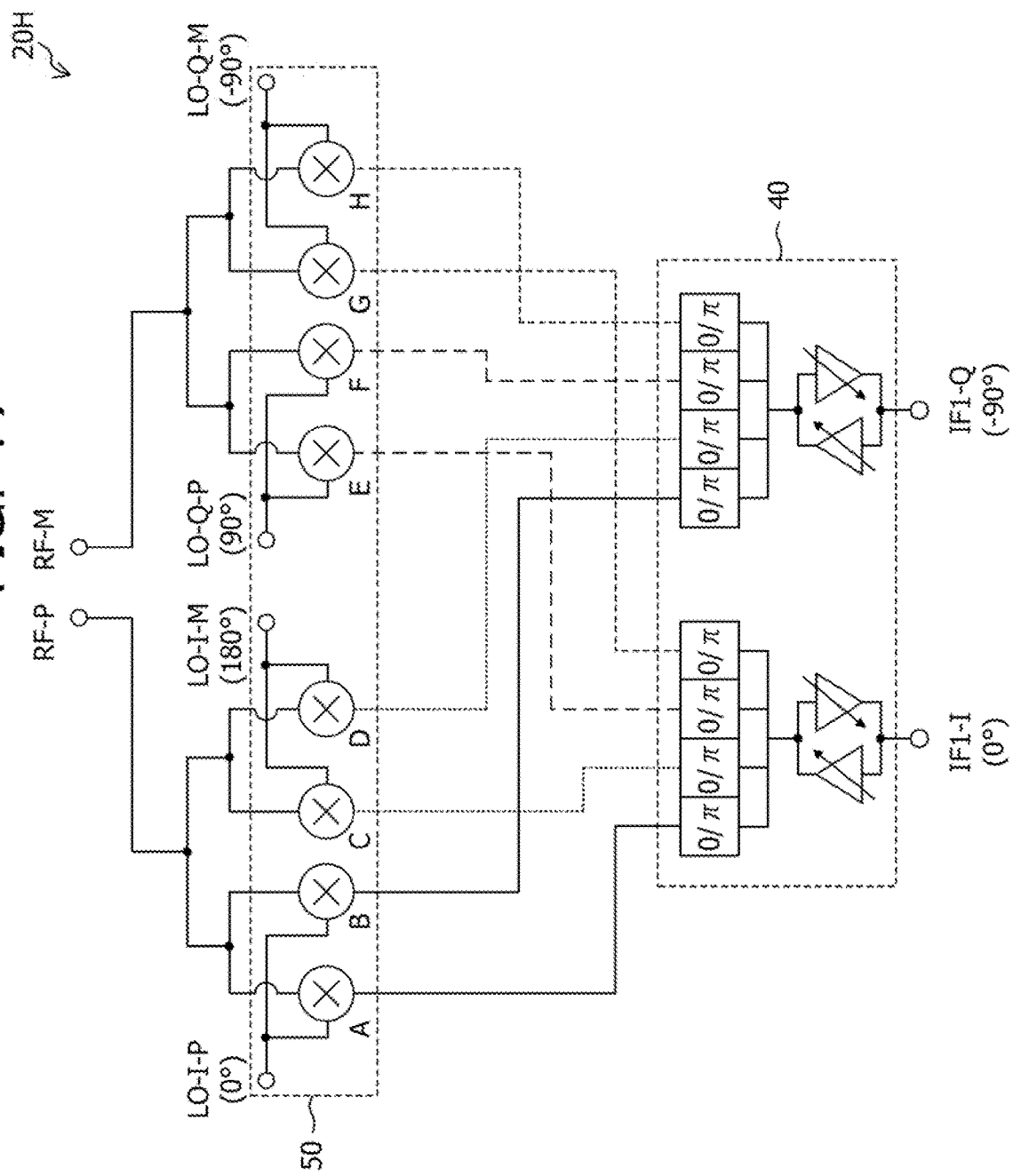
FIG. 17 is a diagram illustrating only a configuration portion related to one of signals in a baseband region or an intermediate frequency band of the phase control circuit according to the ninth embodiment of the disclosed technique.

FIG. 16 is a diagram illustrating an example of a configuration of a phase control circuit 20H according to a ninth embodiment of the disclosed technique. In FIG. 17, for easy understanding of the configuration, only a configuration portion related to one (IF1) of signals (IF1 to IF4) in a baseband region or an intermediate frequency band used in the phase control circuit 20H is illustrated. FIG. 18A to 18D are a table illustrating an example of an operation of the phase control circuit 20H. Note that, in FIGS. 16 to 18D, an RF-P, an RF-I, and an RF signals correspond to the output signal $S_{out}$ or the input signal $S_{in}$ described above. Furthermore, an IF1-I to an IF4-I, an IF1-Q to an IF4-Q, and IF signals correspond to the above-described transmission signals ST1 to ST4 or the reception signals SR1 to SR4.

The phase control circuit 20H is provided in correspondence with each of a plurality of antenna elements AN. The phase control circuit 20H in the present embodiment has a function for forming transmission beams B1 to B4 toward terminals 101 to 104 to transmit transmission signals and a function for forming reception beams to receive the signals transmitted from the terminals 101 to 104.

In addition, the phase control circuit 20H has a single-balanced configuration that differentially inputs two local signals of which phases are orthogonal to each other, differentially inputs/outputs signals in an RF band, and inputs/outputs signals in the baseband region or the intermediate frequency band in a single-ended manner. A positive phase signal LO-I-P of a first local signal LO-I has a phase difference of 0° with respect to a reference phase, and a reverse phase signal LO-I-M of the first local signal LO-I has a phase difference of 180° with respect to the reference phase. A positive phase signal LO-Q-P of a second local signal LO-Q has a phase difference of 90° with respect to the reference phase, and a reverse phase signal LO-Q-M of the second local signal LO-Q has a phase difference of −90° with respect to the reference phase. Furthermore, the positive phase signal RF-I and a reverse phase signal RF-M in the RF band are output at the time of transmission and are input at the time of reception. Furthermore, each of the positive phase signals IF1-I to IF4-I and the quadrature signals IF1-Q to IF4-Q in the baseband region or the intermediate frequency band are input in a single-ended manner at the time of transmission and are output in a single-ended manner at the time of reception.

According to the phase control circuit 20H, it is possible to reduce a loss of signals while suppressing an increase in a circuit size (occupied area of circuit), and in addition, image signals can be reduced. Furthermore, by differentially inputting the local signal to be input to a mixer unit 50, resistance to an exogenous common mode (same phase mode) noise is improved, and leakage of the local signal to the RF terminal can be suppressed. Note that a first to a fourth variable amplifiers 420a to 420d can be arranged on either one of the input sides and the output sides of a first to a fourth phase switching units 410a to 410d.

In the phase control circuit 20H, a local terminal of each mixer to which the local signal LO-I-P is input is shared (interconnected), and a local terminal of each mixer to which the local signal LO-I-M is input is shared (interconnected). Furthermore, a local terminal of each mixer to which the local signal LO-Q-P is input is shared (interconnected), and a local terminal of each mixer to which the local signal LO-Q-M is input is shared (interconnected). Furthermore, an RF terminal of the mixer to/from which the RF signal RF-P is input/output is shared (interconnected), and an RF terminal of the mixer to/from which the RF signal RF-M is input/output is shared (interconnected). As a result, the mixer unit can be configured by, for example, a multi-finger type transistor, and it is possible to configure the mixer unit to be exceedingly compact.

The operation table illustrated in FIG. 18A to 18D is written as focusing on a single IF signal. An example (U1, U2, U3, or U4) of four phase states (one for each of four quadrants) and a switching setting example of a phase switching unit are written. Furthermore, a case where amplification rates of two variable amplifiers that amplify signals orthogonal to each other are made to be the same is illustrated. The following content is described in each column indicated by column numbers [1] to [17] in the operation table in FIG. 18A to 18D.

[1] Output phase state of RF signal (at the time of transmission), four types (one for each quadrant), equivalent to (+45°, +135°, −45°, and −135°), (equivalent to output phase state of IF signal at the time of reception)

[2] Identification symbol of unit mixer (or mixer transistor)

[3] Input phase of local signal (LO signal) to unit mixer

[5] Phase inversion state of LO signal (1: non-inversion, −1: inversion) Note that, since this is an example in the embodiment in which quadrant is not switched with LO signal, only non-conversion is used.

[6] Input phase of IF signal to unit mixer (at the time of transmission) or output phase from unit mixer (at the time of reception)

[8] Phase inversion state of IF signal (0/n switching by phase switching unit, 1: non-inversion, −1: inversion)

[9] Phase inversion switch grouping of IF signal (grouping when quadrant is switched (grouping into two groups), performing phase switching for each group at once)

[10] Phase of upper sideband of RF signal (RF terminal position of unit mixer)

[11] Phase of lower sideband of IRF signal (RF terminal position of unit mixer)

[12] Phase of RF signal at the time of synthesis (transmission) or distribution (reception) (1: in-phase synthesis (distribution), −1: reverse-phase synthesis (distribution))

[13] Phase of leaked LO signal (RF terminal position of unit mixer)

[14] RF output phase (at the time of transmission), IF signal output phase (at the time of reception)

[15] RF upper sideband amplitude (at the time of transmission . . . 1: signal is output, 0: signal is not output (image rejection), at the time of reception . . . 1: signal is received, 0: signal is not received (image rejection))

[16] RF lower sideband amplitude (at the time of transmission . . . 1: signal is output, 0: signal is not output (image rejection), at the time of reception . . . 1: signal is received, 0: signal is not received (image rejection)) Note that, in the example of the operation description table in the embodiment, the lower sideband is set to be image-rejected.

[17] LO signal leakage to RF terminal (0: LO signal is canceled through RF synthesis (distribution) unit, 0: LO signal is not canceled) Note that, in the embodiment, the LO signal is canceled.

The method for selecting the upper sideband and the lower sideband of the image rejection is performed by referring to grouping in the column [4] or column [7].

[4] LO signal inversion RF sideband grouping (classify into group g and group h)

[7] IF signal inversion RF sideband grouping (classify into group e and group f) LO signal phase inversion of group h (or group g) or IF signal phase (re)inversion of group f (or group e). For example, for a unit mixer of the IF signal phase inversion group e, if all the IF signals in the group f are further inverted with respect to the phase inversion (non-inversion) of the IF signal, another sideband is rejected.

Tenth Embodiment

Figure 19:
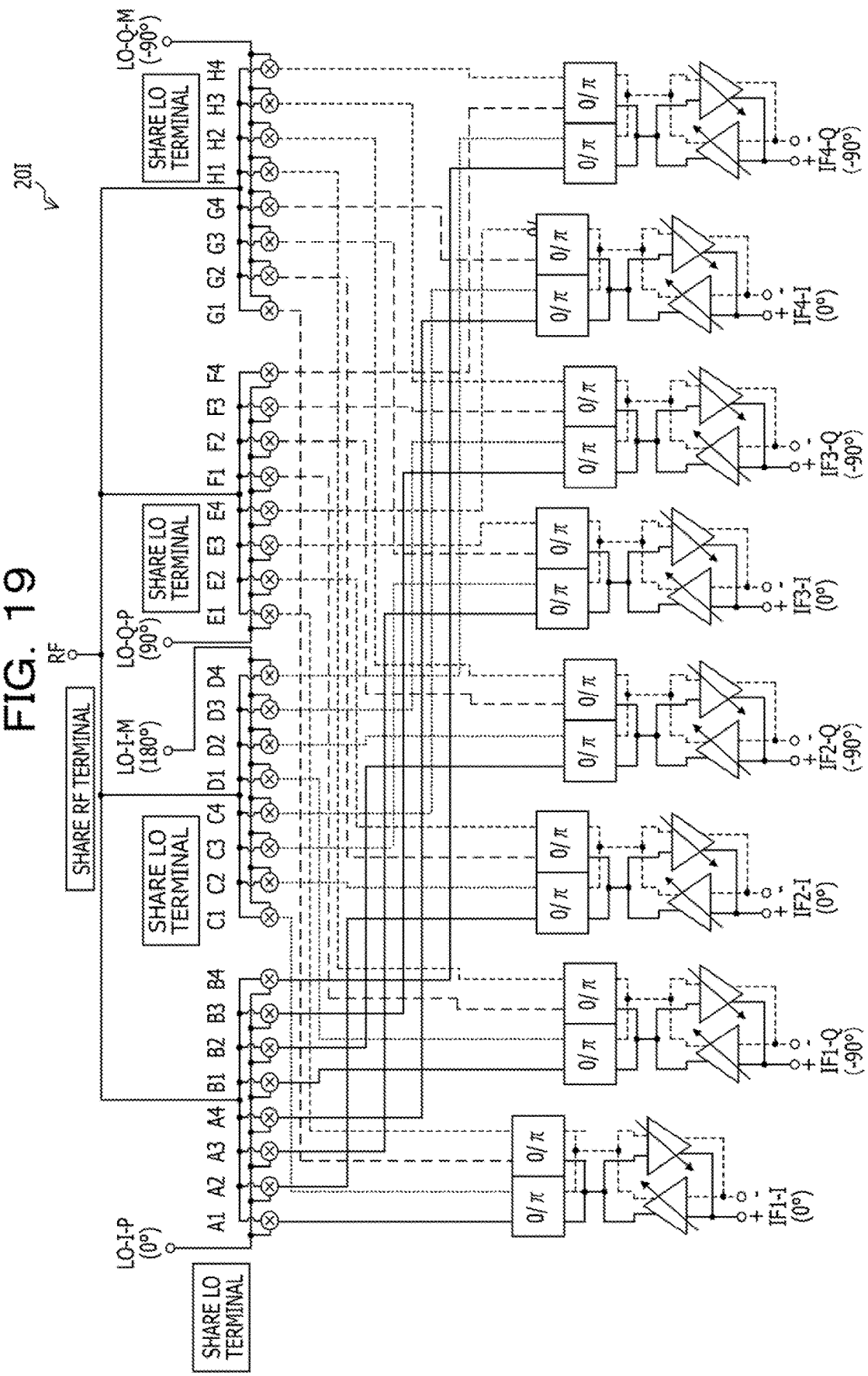
FIG. 19 is a diagram illustrating an example of a configuration of a phase control circuit according to a tenth embodiment of the disclosed technique.
Figure 20:
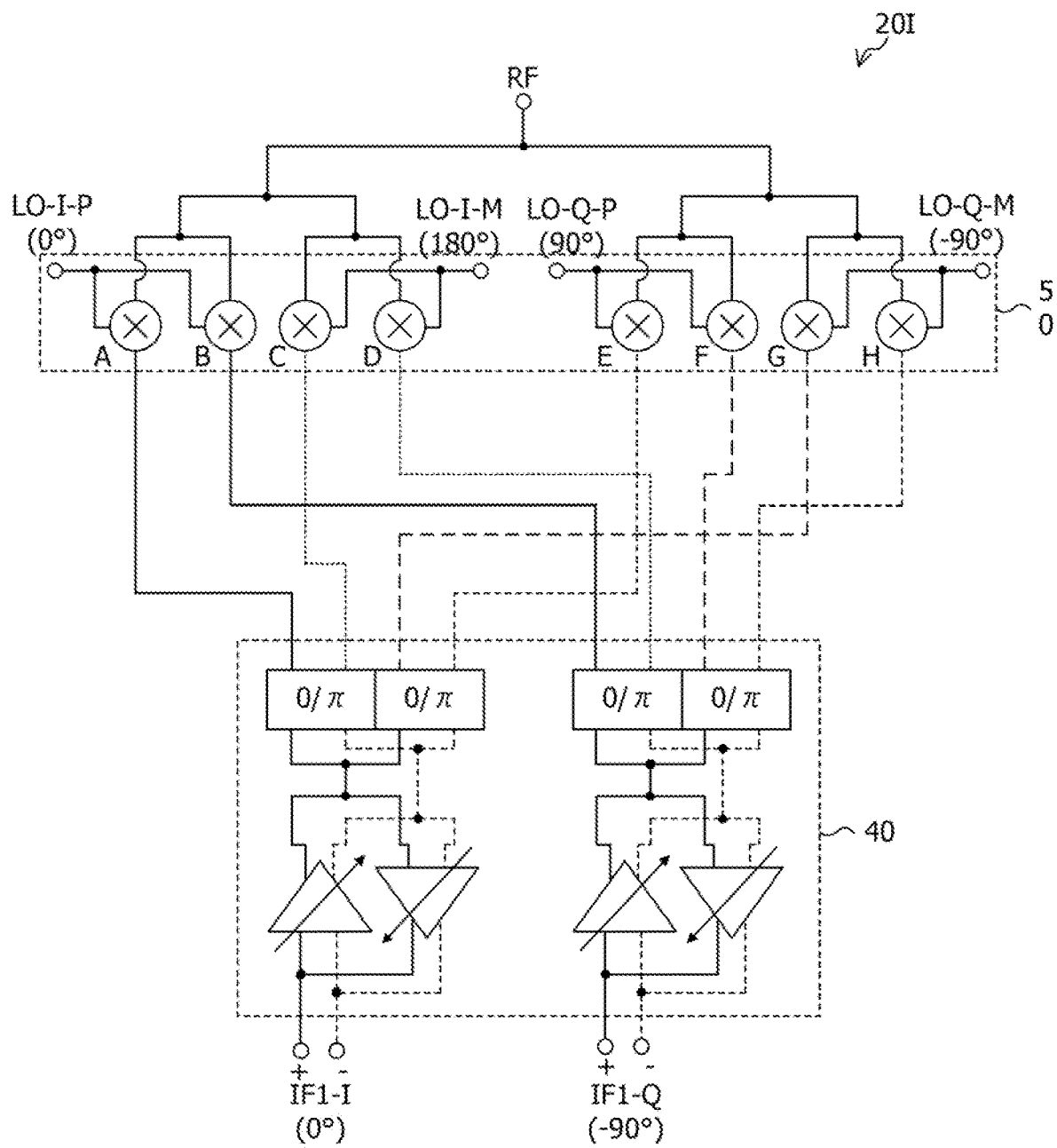
FIG. 20 is a diagram illustrating only a configuration portion related to one of signals in a baseband region or an intermediate frequency band of the phase control circuit according to the tenth embodiment of the disclosed technique.

FIG. 19 is a diagram illustrating an example of a configuration of a phase control circuit 20I according to a tenth embodiment of the disclosed technique. In FIG. 20, for easy understanding of the configuration, only a configuration portion related to one (IF1) of signals (IF1 to IF4) in a baseband region or an intermediate frequency band used in the phase control circuit 20I is illustrated. FIG. 21A to 21D are a table illustrating an example of an operation of the phase control circuit 20I. Note that, in FIGS. 19 to 21D, an RF and an RF signal correspond to the above-described output signal $S_{out}$ or the input signal $S_{in}$. Furthermore, an IF1-I to an IF4-I, an IF1-Q to an IF4-Q, and IF signals correspond to the above-described transmission signals ST1 to ST4 or the reception signals SR1 to SR4.

The phase control circuit 20I is provided in correspondence with each of a plurality of antenna elements AN. The phase control circuit 20I according to the present embodiment has a function for forming transmission beams B1 to B4 toward terminals 101 to 104 to transmit transmission signals and a function for forming reception beams to receive the signals transmitted from the terminals 101 to 104.

In addition, the phase control circuit 20I has a single-balanced configuration that differentially inputs two local signals of which phases are orthogonal to each other, inputs/outputs signals in an RF band in a single-ended manner, and differentially inputs/outputs signals in the baseband region or the intermediate frequency band. A positive phase signal LO-I-P of a first local signal LO-I has a phase difference of 0° with respect to a reference phase, and a reverse phase signal LO-I-M of the first local signal LO-I has a phase difference of 180° with respect to the reference phase. A positive phase signal LO-Q-P of a second local signal LO-Q has a phase difference of 90° with respect to the reference phase, and a reverse phase signal LO-Q-M of the second local signal LO-Q has a phase difference of −90° with respect to the reference phase. The signal RF in the RF band is output in a single-ended manner at the time of transmission and is input in a single-ended manner at the time of reception. Furthermore, the in-phase signals IF1-I to IF4-I and the quadrature signals IF1-Q to IF4-Q in the baseband region or the intermediate frequency band are each differentially input at the time of transmission and is differentially output at the time of reception.

According to the phase control circuit 20I, it is possible to reduce a loss of signals while suppressing an increase in a circuit size (occupied area of circuit), and in addition, image signals can be reduced. Furthermore, by differentially inputting the local signal to be input to a mixer unit 50, resistance to an exogenous common mode (same phase mode) noise is improved, and leakage of the local signal to an RF terminal can be suppressed.

In the phase control circuit 20I, a local terminal of each mixer to which the local signal LO-I-P is input is shared (interconnected), and a local terminal of each mixer to which the local signal LO-I-M is input is shared (interconnected). Furthermore, a local terminal of each mixer to which the local signal LO-Q-P is input is shared (interconnected), and a local terminal of each mixer to which the local signal LO-Q-M is input is shared (interconnected). Furthermore, the RF terminal of the mixer to/from which the RF signal is input/output is shared (interconnected). As a result, the mixer unit can be configured by, for example, a multi-finger type transistor, and it is possible to configure the mixer unit to be exceedingly compact.

Eleventh Embodiment

Figure 22A:
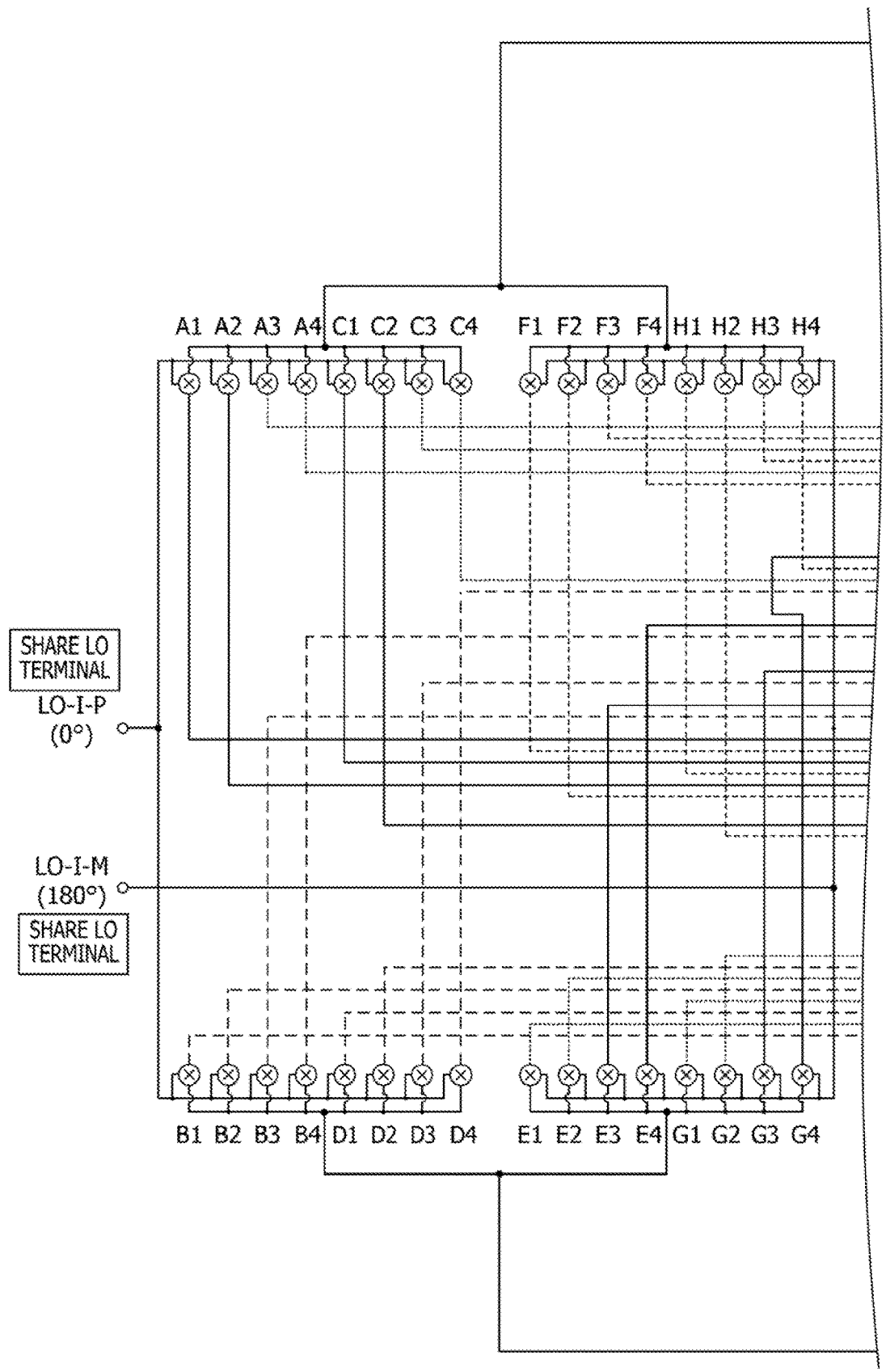
FIG. 22A to 22C are diagrams illustrating an example of a configuration of a phase control circuit according to an eleventh embodiment of the disclosed technique.
Figure 22B:
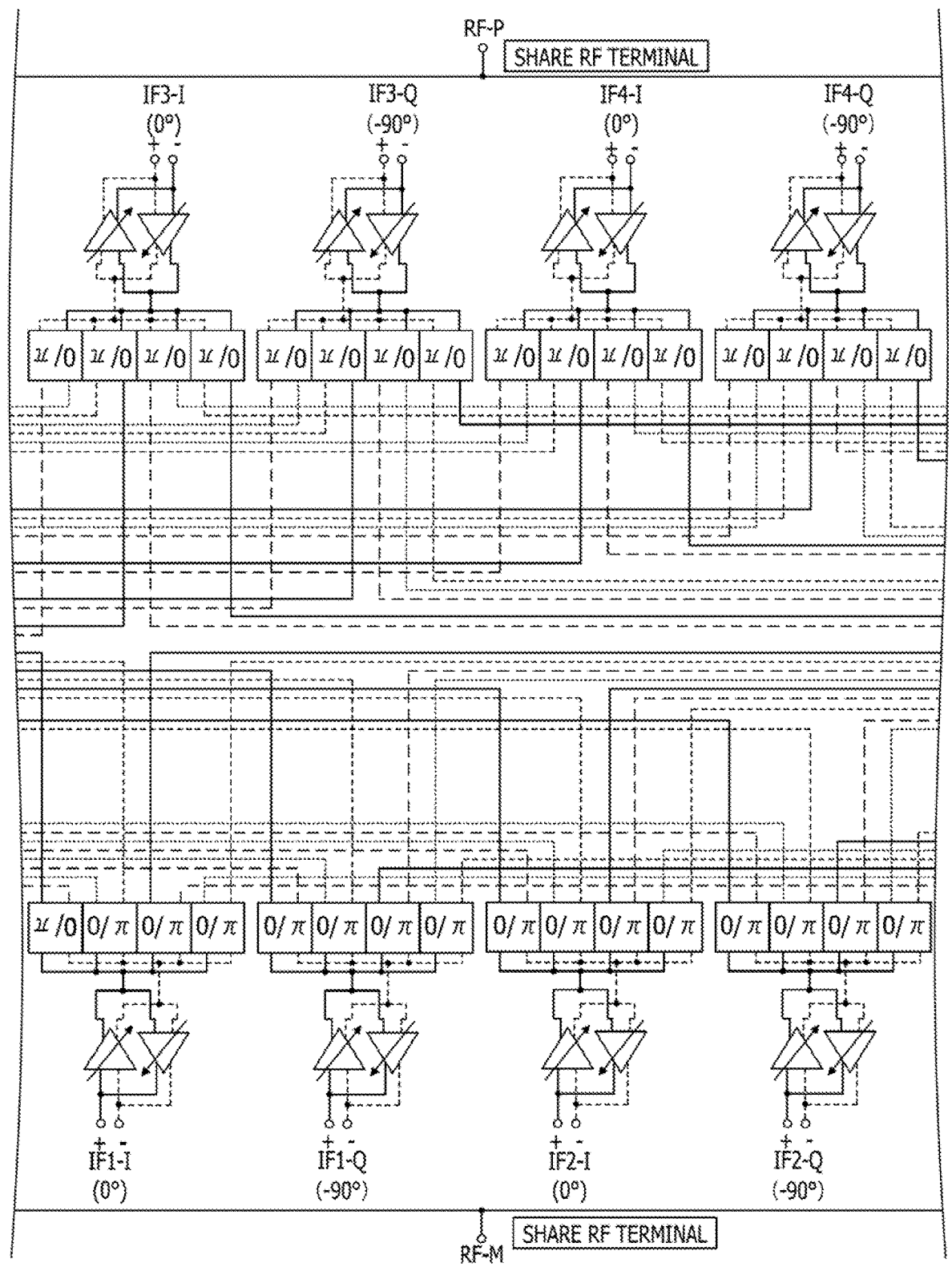
Figure 22C:
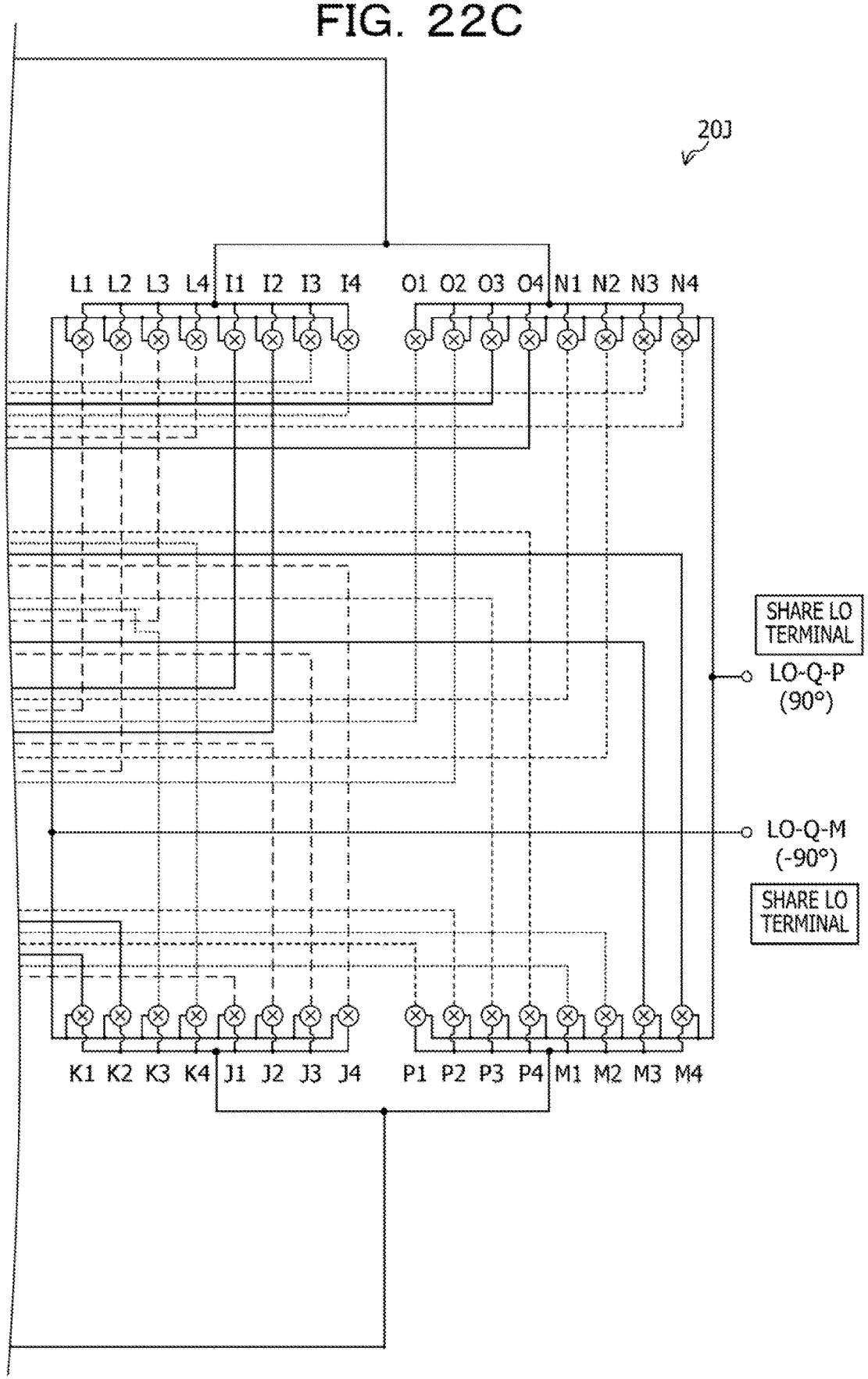
Figure 23:
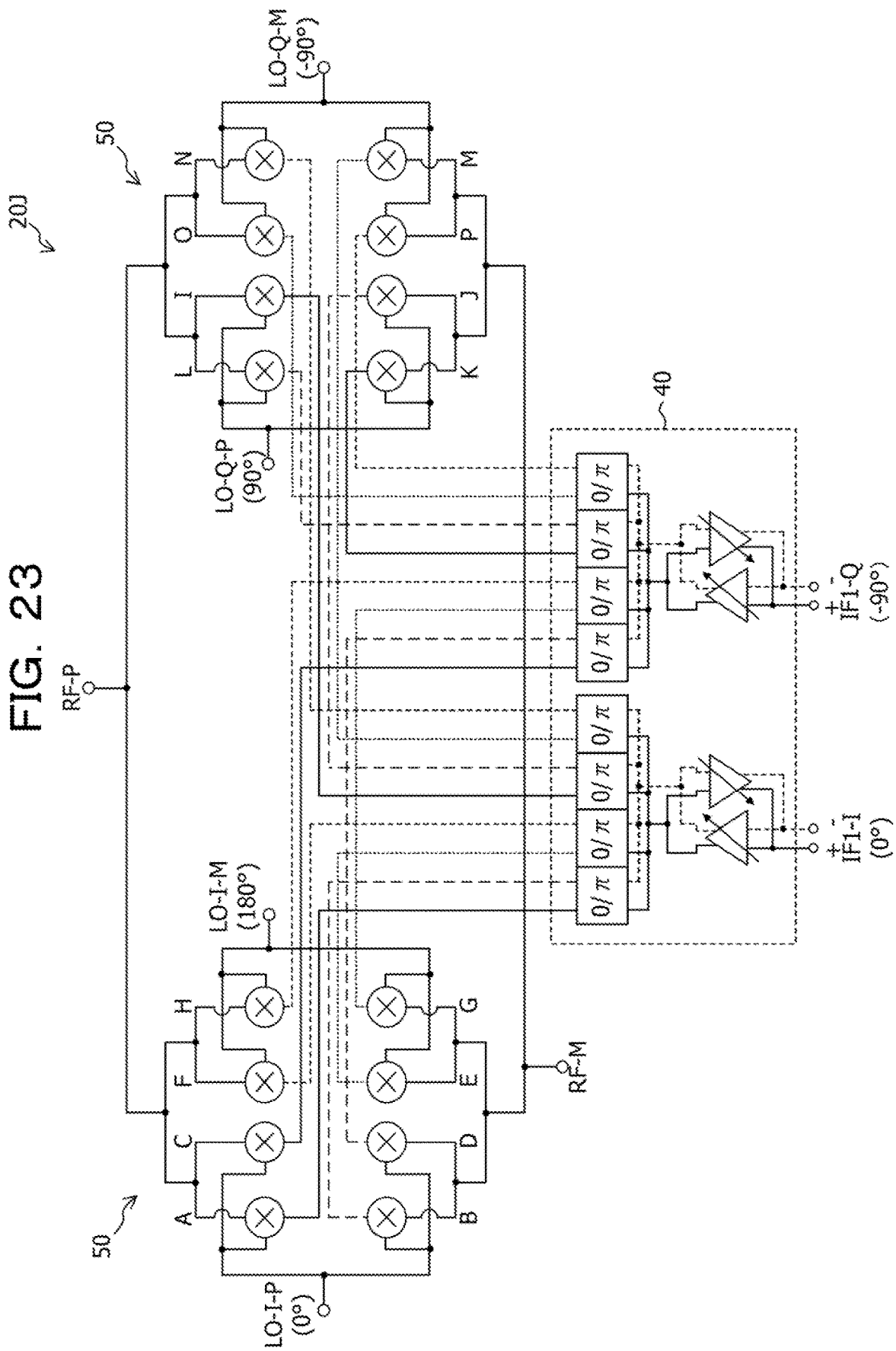
FIG. 23 is a diagram illustrating only a configuration portion related to one of signals in a baseband region or an intermediate frequency band of the phase control circuit according to the eleventh embodiment of the disclosed technique.

FIG. 22A to 22C are diagrams illustrating an example of a configuration of a phase control circuit 20J according to an eleventh embodiment of the disclosed technique. In FIG. 23, for easy understanding of the configuration, only a configuration portion related to one (IF1) of signals (IF1 to IF4) in a baseband region or an intermediate frequency band used in the phase control circuit 20J is illustrated. FIG. 24A to 24G are a table illustrating an example of an operation of the phase control circuit 20). Note that, in FIGS. 22A to 24G, an RF and an RF signal correspond to the above-described output signal $S_{out}$ or the input signal $S_{in}$. Furthermore, an IF1-I to an IF4-I, an IF1-Q to an IF4-Q, and IF signals correspond to the above-described transmission signals ST1 to ST4 or the reception signals SR1 to SR4.

The phase control circuit 203 is provided in correspondence with each of a plurality of antenna elements AN. The phase control circuit 203 has a function for forming transmission beams B1 to B4 toward terminals 101 to 104 to transmit transmission signals and a function for forming reception beams to receive the signals transmitted from the terminals 101 to 104.

In addition, the phase control circuit 203 has a double-balanced configuration that differentially inputs two local signals of which phases are orthogonal to each other, differentially inputs/outputs signals in an RF band, and differentially inputs/outputs signals in the baseband region or the intermediate frequency band. A positive phase signal LO-I-P of a first local signal LO-I has a phase difference of 0° with respect to a reference phase, and a reverse phase signal LO-I-M of the first local signal LO-I has a phase difference of 180° with respect to the reference phase. A positive phase signal LO-Q-P of a second local signal LO-Q has a phase difference of 90° with respect to the reference phase, and a reverse phase signal LO-Q-M of the second local signal LO-Q has a phase difference of −90° with respect to the reference phase. Furthermore, the positive phase signal RF-I and a reverse phase signal RF-M in the RF band are output at the time of transmission and are input at the time of reception. Furthermore, the positive phase signals IF1-I to IF4-I and the quadrature signals IF1-Q to IF4-Q in the baseband region or the intermediate frequency band are differentially input at the time of transmission and is differentially output at the time of reception, respectively.

According to the phase control circuit 20J, it is possible to reduce a loss of signals while suppressing an increase in a circuit size (occupied area of circuit), and in addition, image signals can be reduced. Furthermore, by differentially inputting the local signal to be input to a mixer unit 50, resistance to an exogenous common mode (same phase mode) noise is improved, and leakage of the local signal to an RF terminal can be suppressed.

In the phase control circuit 20J, a local terminal of each mixer to which the local signal LO-I-P is input is shared (interconnected), and a local terminal of each mixer to which the local signal LO-I-M is input is shared (interconnected). Furthermore, a local terminal of each mixer to which the local signal LO-Q-P is input is shared (interconnected), and a local terminal of each mixer to which the local signal LO-Q-M is input is shared (interconnected). Furthermore, an RF terminal of the mixer to/from which the RF signal RF-P is input/output is shared (interconnected), and an RF terminal of the mixer to/from which the RF signal RF-M is input/output is shared (interconnected). As a result, the mixer unit can be configured by, for example, a multi-finger type transistor, and it is possible to configure the mixer unit to be exceedingly compact.

Figure 25:
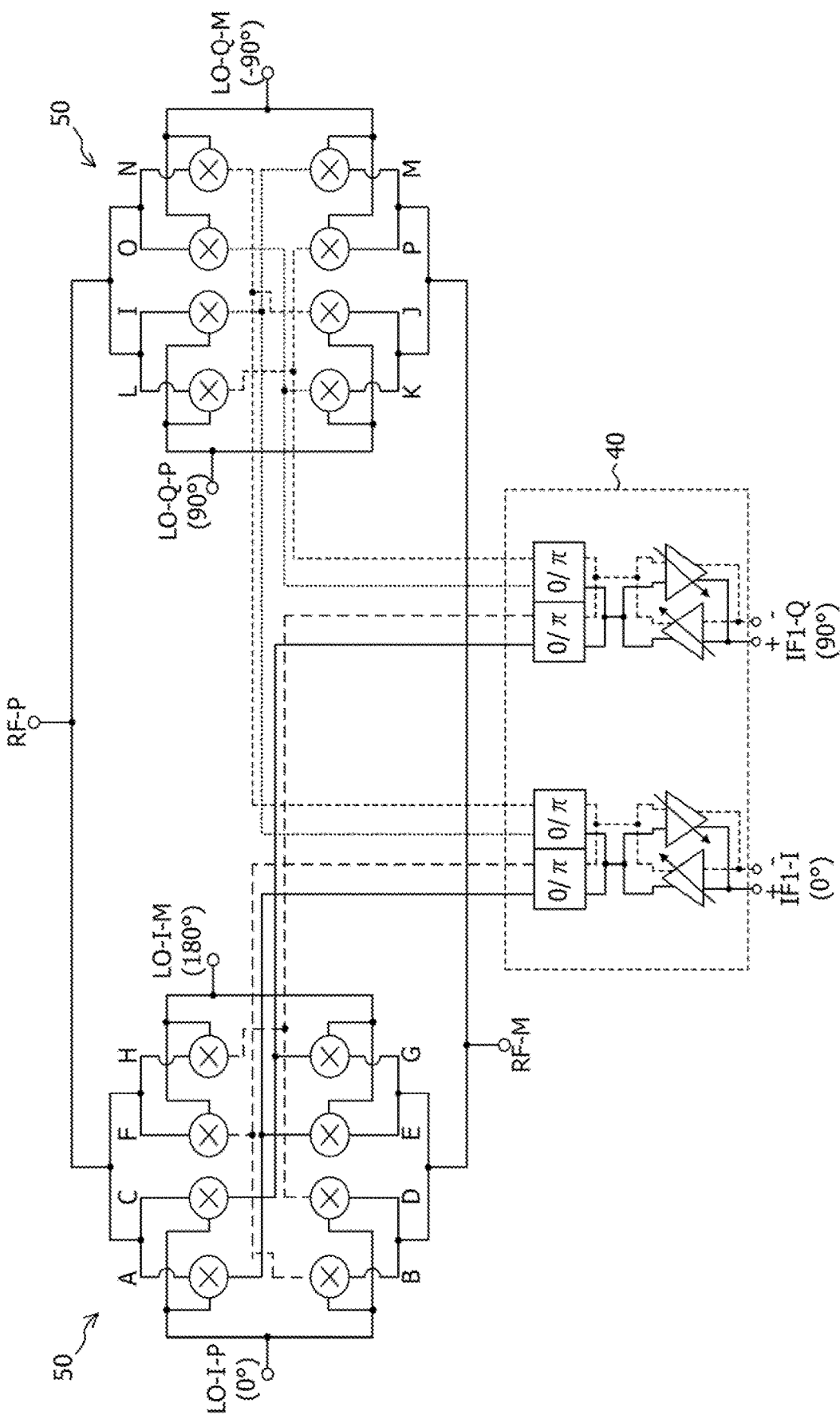
FIG. 25 is a diagram illustrating a modification of the phase control circuit according to the eleventh embodiment of the disclosed technique.

Note that, as illustrated in FIG. 25, the phase control circuit 20J may have a configuration in which two mixers share a phase switching unit. With this configuration, an effect of suppressing an increase in a circuit size (occupied area of a circuit) is promoted.

With respect to the above first to eleventh embodiments, the following supplementary notes are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless device comprising:
    a plurality of antenna elements configured to form a plurality of transmission beams, each of the plurality of transmission beams being configured to transmit a corresponding transmission signal among a plurality of transmission signals; and
    a plurality of phase controllers, each of the plurality of phase controllers being coupled to a corresponding antenna element among the plurality of antenna elements, each of the plurality of phase controllers including:
    a plurality of phase control circuits corresponding to the plurality of transmission beams and configured to receive an input of the plurality of transmission signals to be transmitted from the corresponding antenna element, each of the plurality of phase control circuits being a circuit allocated to among the plurality of transmission beams a corresponding transmission beam to be used to transmit a corresponding transmission signal among the plurality of transmission signals, each of the plurality of phase control circuits being configured to output a phase controlled transmission signal by controlling, based on a transmission direction of the corresponding transmission beam, a phase of the corresponding transmission signal, and
    a plurality of mixers, each of the plurality of mixers being allocated to a corresponding phase control circuit among the plurality of phase control circuits, each of the plurality of mixers being configured to output an up-converted signal by up-converting, in response to inputting of the phase controlled transmission signal from the corresponding phase control circuit, a frequency of the phase controlled transmission signal, wherein the up-converted signals output from the plurality of mixers are merged and radiated from the corresponding antenna element.

2. The wireless device according to claim 1, wherein each of the plurality of phase control circuits includes:
    a first phase switch configured to selectively switch a phase rotation amount of an in-phase signal that has a same phase as a first transmission signal included in the plurality of transmission signals according to a first transmission direction of which the first transmission signal is output and rotates the phase of the in-phase signal,
    a second phase switch configured to selectively switch a phase rotation amount of a quadrature signal obtained by rotating a phase of the first transmission signal by 90° according to the first transmission direction and rotates a phase of the quadrature signal,
    a first variable amplifier configured to change an amplitude of an input signal or an output signal of the first phase switch according to the first transmission direction, and
    a second variable amplifier configured to change an amplitude of an output signal of the second phase switch according to the first transmission direction,
    a first mixer configured to up-convert a frequency of a signal processed by the first phase switch and the first variable amplifier using a local signal, and
    a second mixer configured to up-convert a frequency of a signal processed by the second phase switch and the second variable amplifier using the local signal.

3. The wireless device according to claim 1, wherein each of the plurality of phase control circuits includes:
    a first phase switch and a third phase switch configured to selectively switch a phase rotation amount of an in-phase signal that has the same phase as a first transmission signal included in the plurality of transmission signals according to a first transmission direction of which the first transmission signal is output and rotate the phase of the in-phase signal,
    a second phase switch and a fourth phase switch configured to selectively switch a phase rotation amount of a quadrature signal obtained by rotating the phase of the first transmission signal by 90° according to the first transmission direction and rotate a phase of the quadrature signal,
    a first variable amplifier configured to change an amplitude of an input signal or an output signal of the first phase switch according to the first transmission direction,
    a second variable amplifier configured to change an amplitude of an input signal or an output signal of the second phase switch according to the first transmission direction,
    a third variable amplifier configured to change an amplitude of an input signal or an output signal of the third phase switch according to the first transmission direction, and
    a fourth variable amplifier configured to change an amplitude of an input signal or an output signal of the fourth phase switch according to the first transmission direction, a first mixer configured to up-convert a frequency of the signal processed by the first phase switch and the first variable amplifier using a first local signal, a second mixer configured to up-convert a frequency of the signal processed by the second phase switch and the second variable amplifier using the first local signal, a third mixer configured to up-convert a frequency of a signal processed by the third phase switch and the third variable amplifier using a second local signal obtained by rotating a phase of the first local signal by 90°, and a fourth mixer configured to up-convert a frequency of a signal processed by the fourth phase switch and the fourth variable amplifier using the second local signal.

4. The wireless device according to claim 1, wherein each of the plurality of phase control circuits includes at least one of a lumped parameter circuit, a spiral inductor, or a meander inductor.

5. The wireless device according to claim 2, wherein each of the plurality of phase control circuits further includes:

a third phase switch configured to selectively switch a phase rotation amount of an in-phase signal that has a same phase as a second transmission signal included in the plurality of transmission signals according to a second transmission direction of which the second transmission signal is output and rotates the phase of the in-phase signal, a fourth phase switch configured to selectively switch a phase rotation amount of a quadrature signal obtained by rotating a phase of the second transmission signal by 90° according to the second transmission direction and rotates a phase of the quadrature signal, a third variable amplifier configured to change an amplitude of an input signal or an output signal of the third phase switch according to the second transmission direction, and a fourth variable amplifier configured to change an amplitude of an output signal of the fourth phase switch according to the second transmission direction, a third mixer configured to up-convert a frequency of a signal processed by the third phase switch and the third variable amplifier using a local signal, and a fourth mixer configured to up-convert a frequency of a signal processed by the fourth phase switch and the fourth variable amplifier using the local signal, wherein the first mixer, the second mixer, the third mixer, and the fourth mixer share a local terminal to which the local signal is input.

6. The wireless device according to claim 3, wherein each of the plurality of phase control circuits further includes:

a fifth phase switch and a seventh phase switch configured to selectively switch the phase rotation amount of an in-phase signal that has the same phase as a second transmission signal included in the plurality of the transmission signals according to a second transmission direction of which the second transmission signal is output and rotate the phase of the in-phase signal, a sixth phase switch and an eighth phase switch configured to selectively switch the phase rotation amount of a quadrature signal obtained by rotating a phase of the second transmission signal by 90° according to the second transmission direction and rotate the phase of the quadrature signal, a fifth variable amplifier configured to change an amplitude of an input signal or an output signal of the fifth phase switch according to the second transmission direction, a sixth variable amplifier configured to change an amplitude of an input signal or an output signal of the sixth phase switch according to the second transmission direction, a seventh variable amplifier configured to change an amplitude of an input signal or an output signal of the seventh phase switch according to the second transmission direction, and an eighth variable amplifier configured to change an amplitude of an input signal or an output signal of the eighth phase switch according to the second transmission direction, a fifth mixer configured to up-convert a frequency of a signal processed by the fifth phase switch and the fifth variable amplifier using the first local signal, a sixth mixer configured to up-convert a frequency of the signal processed by the sixth phase switch and the sixth variable amplifier using the first local signal, a seventh mixer configured to up-convert a frequency of the signal processed by the seventh phase switch and the seventh variable amplifier using the second local signal obtained by rotating a phase of the first local signal by 90°, and an eight mixer configured to up-convert a frequency of the signal processed by the eight phase switch and the eighth variable amplifier using the second local signal, wherein, the first mixer, the second mixer, the fifth mixer, and the sixth mixer share a local terminal to which the first local signal is input, and the third mixer, the fourth mixer, the seventh mixer, and the eight mixer share a local terminal to which the second local signal is input.

7. The wireless device according to claim 5, wherein the first mixer, the second mixer, the third mixer, and the fourth mixer share a radio frequency (RF) terminal which the first mixer, the second mixer, the third mixer, and the fourth mixer output an output signal.

8. The wireless device according to claim 6, wherein the first mixer, the second mixer, the third mixer, the fourth mixer, the fifth mixer, the seventh mixer, and the eight mixer share a radio frequency (RF) terminal which the first mixer, the second mixer, the third mixer, the fourth mixer, the fifth mixer, the seventh mixer, and the eight mixer output an output signal.

9. A wireless device comprising:

a first mixer configured to up-convert a frequency of an in-phase signal that has a same phase as a first transmission signal included in a plurality of transmission signals using a signal obtained by rotating a first local signal by a rotation amount according to a first transmission direction of the first transmission signal;

a second mixer configured to up-convert a frequency of a quadrature signal obtained by rotating a phase of the first transmission signal by 90° using a signal obtained by rotating a second local signal of which a phase is rotated by 90° with respect to the first local signal by a rotation amount according to the first transmission direction;

a third mixer configured to up-convert a frequency of an in-phase signal that has a same phase as a second transmission signal included in the plurality of transmission signals using a signal obtained by rotating the first local signal by a rotation amount according to a second transmission direction of the second transmission signal;

a fourth mixer configured to up-convert a frequency of a quadrature signal obtained by rotating a phase of the second transmission signal by 90° using a signal obtained by rotating a second local signal of which a phase is rotated by 90° with respect to the first local signal by a rotation amount according to the second transmission direction; and an antenna element configured to radiate a signal obtained by combining a first signal outputting from the first mixer output, a second signal outputting from the second mixer output, a third signal outputting from the third mixer output, and a fourth signal outputting from the fourth mixer output.

10. A wireless device comprising:

a plurality of antenna elements configured to form a plurality of reception beams, each of the plurality of reception beams being configured to receive a corresponding reception signal among a plurality of reception signals; and a plurality of phase controllers, each of the plurality of phase controllers being coupled to a corresponding antenna element among the plurality of antenna elements, each of the plurality of phase controllers including:

a plurality of mixers configured to receive, from the corresponding antenna element, an input signal combined with the plurality of reception signals, each of the plurality of mixers being configured to output a down-converted signal by down-converting a frequency of the input signal, and a plurality of phase control circuits corresponding to the plurality of reception beams, each of the plurality of phase control circuits being coupled to a corresponding mixer among the plurality of mixers, each of the plurality of phase control circuits being allocated to among the plurality of reception beams a corresponding reception beam used to receive a corresponding reception signal among the plurality of reception signals, each of the plurality of phase control circuits being configured to output a phase controlled signal by controlling, in response to inputting of the down-converted signal from the corresponding mixer, a phase of the down-converted signal in accordance with an arrival direction of the corresponding reception beam, wherein the phase controlled signal output from the each of the plurality of phase control circuits is used to synthesize the corresponding reception signal among the plurality of reception signals.

11. The wireless device according to claim 10, wherein the plurality of mixers down-convert the frequency of the input signal using a local signal.

12. The wireless device according to claim 10, wherein the plurality of mixers includes:

a first mixer, and
a second mixer, the plurality of phase control circuits includes:

a first phase switch configured to selectively switch a phase rotation amount of an output signal from the first mixer according to a first arrival direction of a first reception signal included in the plurality of reception signals and rotates a phase of output signal from the first mixer, a second phase switch configured to selectively switch a phase rotation amount of an output signal from the second mixer according to a second arrival direction of a second reception signal included in the plurality of reception signals and rotates a phase of the output signal from the second mixer, a first variable amplifier configured to change an amplitude of an input signal or an output signal of the first phase switch according to the first arrival direction, a second variable amplifier configured to change an amplitude of an output signal of the second phase switch according to the second arrival direction, and a phase rotation circuit configured to rotate a phase of a signal which is processed by the second phase switch and the second variable amplifier by 90°.

13. The wireless device according to claim 10, wherein the plurality of mixers includes:

a first mixer and a second mixer configured to down-convert the frequency of the input signal using a first local signal, and a third mixer and a fourth mixer configured to down-convert the frequency of the input signal using a second local signal which phase is rotated by 90° with respect to the first local signal, the plurality of phase control circuits includes:

a first phase switch configured to selectively switch a phase rotation amount of an output signal from the first mixer according to an arrival direction of a first reception signal included in the plurality of reception signals and rotates a phase of output signal from the first mixer, a second phase switch configured to selectively switch a phase rotation amount of an output signal from the second mixer according to a first arrival direction of a second reception signal included in the plurality of reception signals and rotates a phase of the output signal from the second mixer, a third phase switch configured to selectively switch a phase rotation amount of an output signal from the third mixer according to a second arrival direction of a third reception signal included in the plurality of reception signals and rotates a phase of output signal from the third mixer, a fourth phase switch configured to selectively switch a phase rotation amount of an output signal from the fourth mixer according to a third arrival direction of a fourth reception signal included in the plurality of reception signals and rotates a phase of the output signal from the fourth mixer, a first variable amplifier configured to change an amplitude of an input signal or an output signal of the first phase switch according to the first arrival direction, a second variable amplifier configured to change an amplitude of an output signal of the second phase switch according to the second arrival direction, a third variable amplifier configured to change an amplitude of an input signal or an output signal of the third phase switch according to the third arrival direction, a fourth variable amplifier configured to change an amplitude of an output signal of the fourth phase switch according to the second arrival direction, and a phase rotation circuit configured to rotate a phase of a signal which is processed by the second phase switch and the second variable amplifier by 90° and rotate a phase of a signal which is processed by the fourth phase switch and the fourth variable amplifier by 90°.

* * * * *